US007780870B2

(12) United States Patent
Kato et al.

(10) Patent No.: US 7,780,870 B2
(45) **Date of Patent: *Aug. 24, 2010**

(54) LIQUID CRYSTAL COMPOSITION, LIQUID CRYSTAL ELEMENT, AND SILOXANE POLYMER

(75) Inventors: Takashi Kato, Kanagawa (JP); Koji Takaku, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 292 days.

This patent is subject to a terminal disclaimer.

(21) Appl. No.: 11/883,289

(22) PCT Filed: Jan. 30, 2006

(86) PCT No.: PCT/JP2006/301912

§ 371 (c)(1), (2), (4) Date: Jul. 30, 2007

(87) PCT Pub. No.: WO2006/080573

PCT Pub. Date: Aug. 3, 2006

(65) Prior Publication Data

US 2008/0152843 A1 Jun. 26, 2008

(30) Foreign Application Priority Data

Jan. 31, 2005 (JP) ............................. 2005-023145
Jan. 31, 2005 (JP) ............................. 2005-023146

(51) Int. Cl.
*C09K 19/00* (2006.01)
*C09K 19/06* (2006.01)
*C09K 19/52* (2006.01)

(52) U.S. Cl. ............................. 252/299.01; 252/299.6; 428/1.1; 430/20

(58) Field of Classification Search ............ 252/299.01, 252/299.6; 428/1.1; 430/20, 270.1
See application file for complete search history.

(56) References Cited

U.S. PATENT DOCUMENTS

| | | | | |
|---|---|---|---|---|
| 5,679,414 | A | 10/1997 | Akashi et al. | |
| 7,033,523 | B2 * | 4/2006 | Tork et al. | 252/299.01 |
| 7,338,690 | B2 * | 3/2008 | Takaku et al. | 428/1.1 |
| 7,427,364 | B2 * | 9/2008 | Takaku et al. | 252/299.1 |
| 2007/0218216 | A1 * | 9/2007 | Kato et al. | 428/1.1 |

FOREIGN PATENT DOCUMENTS

| | | | |
|---|---|---|---|
| EP | 0 354 753 | A | 2/1990 |
| EP | 0 578 135 | A | 1/1994 |
| GB | 2 249 794 | A | 5/1992 |
| JP | 9-33894 | A | 2/1997 |
| JP | 9-40955 | A | 2/1997 |
| JP | 10-67990 | A | 3/1998 |

OTHER PUBLICATIONS

Schiewe B et al., Liquid Crystals, vol. 20, No. 5, May 1, 1996, pp. 635-640.
Chain-Shu Hsu et al., Liquid Crystals, vol. 22, No. 6, Jun. 1997, pp. 669-677.
Chang H-L et al., Macromolecular Chemistry and Physics, vol. 198, No. 10, Oct. 1997, pp. 2985-2992.
Skorokhodov S. Macromolecular, vol. 125, Mar. 1998, pp. 145-154.
Shibaev P V et al., Liquid Crystals, vol. 30, No. 12, Dec. 2003, pp. 1391-1400.
Laffitte J-D et al., Liquid Crystals, vol. 16, No. 2, Feb. 1, 1994, pp. 223-233.
Schiewe B et al., Liquid Crystals, vol. 20, No. 5, May 1, 1996, pp. 635-640, XP 000589669.
Chain-Shu Hsu et al., Liquid Crstal, vol. 22, No. 6, Jun. 1997, pp. 669-677, XP 000689489.
Chang H-L et al., Macromolecular Chemistry and Physics, vol. 198, No. 10, Oct. 1997, pp. 2985-2992, XP 000727206.
Skorokhodov S. Macromolecular, vol. 125, Mar. 1998, pp. 145-154, XP 000766482.
Shibaev P V et al., Liquid Crystals, vol. 30, No. 12, Dec. 2003, pp. 1391-1400, XP 001177313.
Laffitte J-D et al., Liquid Crystals, vol. 16, No. 2, Feb. 1, 1994, pp. 223-233, XP 000420700.

* cited by examiner

*Primary Examiner*—Geraldina Visconti
(74) *Attorney, Agent, or Firm*—Birch, Stewart, Kolasch & Birch, LLP

(57) ABSTRACT

The present invention provides a liquid crystal composition including a siloxane polymer, a nematic liquid crystal compound substituted with at least one fluorine atom, and at least one dichroic dye; and a liquid crystal composition including a siloxane polymer having liquid crystalline group at the side chain of the polymer, a low molecular-weight liquid crystal compound, and a dichroic dye, in which the dielectric constant anisotropy of the liquid crystal composition is changed from being positive to being negative when the frequency of the voltage to be applied is increased.

21 Claims, No Drawings

LIQUID CRYSTAL COMPOSITION, LIQUID CRYSTAL ELEMENT, AND SILOXANE POLYMER

TECHNICAL FIELDS

The present invention relates to a liquid crystal composition, a liquid crystal element having a liquid crystal layer containing the liquid crystal composition, in particular, a liquid crystal element preferably used for a guest-host type liquid crystal element, and a siloxane polymer preferably usable in the liquid crystal composition and the liquid crystal element.

BACKGROUND ART

With the spread of the digital technology, the importance of a paper type display for displaying digital information (hereinafter referred to as "electronic paper") has been increasing. The performance required for the electronic paper includes a high visual recognition and a low electric power consumption. High visual recognition means white background similar to paper, and hence a display method based on light-scattering white background similar to paper is suited. On the other hand, as to the electric power consumption, the reflection type display system has a lower power consumption as compared with that of self light-emission display system. Many systems have been proposed so far for the electronic paper. Examples include a reflection type liquid crystal display system, electrophoresis display system, magnetophoresis display system, dichroic ball rotation system, electrochromic display system, and leucothermal system. Any of these methods is not satisfactory from the viewpoint of high visual recognition, and improvement therefore has been demanded.

Many liquid crystal element (liquid crystal display element) systems have been proposed, and among the systems, the guest-host type liquid crystal element is capable of displaying a bright image, and is expected to be a liquid crystal element suited to a reflection type display system. In the guest-host type liquid crystal display, a liquid crystal composition containing a dichroic dye dissolved in a nematic liquid crystal is sealed in a cell, an electric field is applied thereto, and the orientation of the dichroic dye is changed depending on the movement of the liquid crystal by the electric field, and the light absorption state of the cell is changed to display an image. The dichroic dye has a uniaxial light absorbing axis, and absorbs only the light oscillating in the direction of the light absorbing axis, so that the light absorbing state of the cell can be changed by changing the orientation of the dichroic dye and controlling the direction of the light absorbing axis in accordance with the movement of the liquid crystal cell due to the electric field. This guest-host type liquid crystal cell is expected to be able to display a brighter image, as compared with the conventional liquid crystal cell, since a drive system without using a polarizer is possible. On the other hand, a polymer dispersion type liquid crystal display system, in which a polymer and a liquid crystal molecule are mixed has been proposed. In this system, since an eye-friendly display is possible because of light-scattering white background; orientation film and orientation process are not needed; manufacture by coating is possible, it is expected that an inexpensive display device can be obtained. In particular, a polymer dispersion type liquid crystal display system prepared by mixing a siloxane polymer and a fluorine-type nematic liquid crystal is proposed (see, for example, Japanese Patent Application Laid-Open (JP-A) No. 2002-250939). This system is a light-scattering method in which the light-scattering and light-transmitting state is controlled. In this method, however, the scatter luminance is low and display performance is not satisfactory yet, and improvement has been demanded.

A guest-host polymer dispersion liquid crystal display system in which a polymer dispersion system and guest-host system are combined, has been proposed (see, for example, JP-A No. 9-40955). In this system, since a drive system without using polarizer is possible, an eye-friendly display based on a light-scattering white background is possible. As a low molecular-weight liquid crystal, a cyano-type liquid crystal E-7 is used. In the conventional system, however, the display performance is not satisfactory yet, and improvement has been demanded.

It has been known that the display contrast of the guest-host type liquid crystal display element varies with an order parameter of a dichroic dye in a liquid crystal composition for constituting a liquid crystal layer, or a host liquid cell or a cell structure. Generally, when the liquid crystal composition, in which a nematic liquid crystal and dichroic dye is combined, is disposed between substrates which is subjected to an orientation treatment, only the linearly polarized light at one side is absorbed, and the half of the light is transmitted, because the nematic liquid crystal assumes a uniaxial orientation state, so that the display contrast ratio cannot be enhanced. When a liquid crystal composition in which a nematic liquid crystal and a dichroic dye are injected between substrates which have not been subjected to a orientation treatment, the composition assumes an multi-domain state, and only the linearly polarized light of one side is absorbed and half of the light is transmitted, so that the display contrast ratio is not enhanced.

As methods for absorbing lights in all directions, a phase transition system, a ¼ wave plate system, and mode of dispersing a guest-host liquid crystal droplets in polymer (GH-PDLC) have been proposed.

In the phase transition system, due to the influence of the refractive index anisotropy of the liquid crystal to be used, the absorbance may be reduced by the rotation of the incident light along the spiral structure of the liquid crystal.

In the ¼ wave plate system, a metal reflector plate is needed to prevent the cancellation of polarized light, and a white background due to light-scattering cannot be obtained.

In contrast, in the GH-PDLC, axial directions become random among liquid crystal droplets, and lights in all directions can be absorbed. However, a high voltage is required to move the liquid crystal bound by a polymer network, and the display contrast ratio is not increased.

In order to solve these problems, a system using a liquid crystal polymer having liquid crystalline groups in the polymer side chain portion has been proposed. In this system, the side chain liquid crystal molecules respond to the application of voltage, and the display contrast ratio is enhanced. A polymer main chain having a small dielectric constant is preferable, and it has been known that a liquid crystalline siloxane polymer is preferable. (see, for example, JP-A No. 9-40955). In the mixed liquid crystal, the switching of the liquid crystal element is performed by changing the orientation of the liquid crystal by on/off switching of the electric field, and improvement of responsive speed has been demanded. On the other hand, it has been proposed "two-frequency driving method" in which the orientation of a liquid crystal is reversibly changed by applying an electric field by utilizing a two-frequency driving liquid crystal which changes the dielectric constant anisotropy $\Delta\epsilon$ from being positive to being negative with an increase in the frequency of voltage to be applied, (see, for example, Applied Physics Letters, Vol. 25, No. 4, 186-188, 1974). In this method, the element can actively be switched off, and by making use of this advantage of a fast responsive speed, and the method was once used in projector applications.

The GH-PDLC using this two-frequency driving liquid crystal has been known (see, for example, JP-A No. 9-33894). However, the polymer is acrylate-type oligomer which does not have liquid crystalline groups, and this system is not satisfactory in light of the display contrast and driving voltage. Accordingly, a liquid crystal element having a higher contrast ratio and a faster responsive speed is desirable.

DISCLOSURE OF INVENTION

The present invention has been made in view of the above circumferences and provides, in a polymer dispersion type guest-host system, a liquid crystal composition having a quick display response speed and high display performance, and a liquid crystal element including the liquid crystal composition; and a liquid crystal composition having a high display contrast and quick display responsive speed, and a liquid crystal element including the liquid crystal composition, and a siloxane polymer preferably used in the liquid crystal composition and the liquid crystal element.

That is, a first aspect of the present invention provides the following [1] to [10], and a second aspect of the present invention provides the following [11] to [23].

[1]. A liquid crystal composition comprising a siloxane polymer, a nematic liquid crystal compound substituted with at least one fluorine atom, and at least one dichroic dye.

[2]. The liquid crystal composition of [1], wherein the siloxane polymer contains a repeating unit represented by formula (1);

Formula (1)

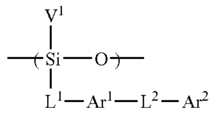

wherein $V^1$ represents an alkyl group, a cycloalkyl group, an aryl group or a heteroaryl group, $L^1$ and $L^2$ represent divalent linking groups, respectively, and $Ar^1$ and $Ar^2$ each independently represent an aryl group or a heteroaryl group.

[3]. The liquid crystal composition of [2], wherein $V^1$ in Formula (1) represents an alkyl group.

[4]. The liquid crystal composition of [2] or [3], wherein $L^2$ in Formula (1) represents an ester group.

[5]. The liquid crystal composition of any one of [1] to [4], wherein the dichroic dye is at least one of anthraquinone compounds and phenoxazone compounds.

[6]. The liquid crystal composition of any one of [1] to [5], wherein the dichroic dye has a substituent represented by Formula (2);

$$-(Het)_j-\{(B^1)_p-(Q^1)_q-(B^2)_r\}_n-C^1 \quad \text{Formula (2)}$$

wherein Het is an oxygen atom or a sulfur atom, $B^1$ and $B^2$ each independently are an arylene group, a heteroarylene group, or a divalent aliphatic hydrocarbon group, $Q^1$ is a divalent linking group, $C^1$ is an alkyl group, a cycloalkyl group, an alkoxy group, an alkoxy carbonyl group, an acyl group or an acyl oxy group, j represents 0 or 1, p, q and r each independently represent an integer of 0 to 5, n is an integer of 1 to 3, the total number of the groups represented by $B^1$ and the groups represented by $B^2$ is an integer of from 3 to 10, when p, q and r each represent 2 or more, two or more of $B^1$, $Q^1$ and $B^2$ may be the same or different from one another, and when n is 2 or more, two or more of $\{(B^1)_p-(Q^1)_q-(B^2)_r\}$ may be the same or different from one another.

[7]. The liquid crystal composition of [6], wherein at least one of the dichroic dyes is a compound represented by Formula (3);

Formula (3)

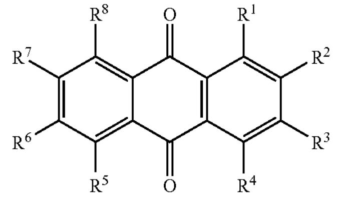

wherein at least one of $R^1$, $R^2$, $R^3$, $R^4$, $R^5$, $R^6$, $R^7$ and $R^8$ represents $-(Het)_j-\{(B^1)_p-(Q^1)_q-(B^2)_r\}_n-C^1$, the others each independently represent a hydrogen atom or substituent Het represents an oxygen atom or a sulfur atom, $B^1$ and $B^2$ each independently represent an arylene group, a heteroarylene group or a divalent cyclic aliphatic hydrocarbon group, $Q^1$ represents a divalent linking group, $C^1$ represents an alkyl group, a cycloalkyl group, an alkoxy group, an alkoxy carbonyl group, an acyl group, or an acyloxy group, j is 0 or 1, p, q and r each independently represents an integer of 0 to 5, n represents an integer of 1 to 3, the sum of the numbers of $B^1$ and $B^2$ is an integer of 3 to 10, when p, q and r each represent 2 or more, two or more of $B^1$, $Q^1$ and $B^2$ may be the same or different from one another, and when n is 2 or more, two or more of $\{(B^1)_p-(Q^1)_q-(B^2)_r\}$ may be the same or different from one another.

[8]. The liquid crystal composition of [6], wherein at least one of the dichroic dyes is a compound represented by Formula (4);

Formula (4)

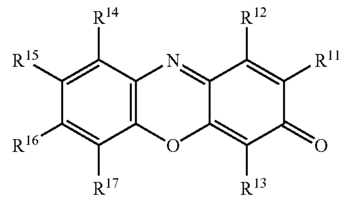

wherein at least one of $R^{11}$, $R^{12}$, $R^{13}$, $R^{14}$, $R^{15}$, $R^{16}$ and $R^{17}$ represents $-(Het)_j-\{(B)_p-(Q^1)_q-(B^2)_r\}_n-C^1$, the others each independently represent a hydrogen atom or a substituent; Het represents an oxygen atom or a sulfur atom, $B^1$ and $B^2$ each independently represents an arylene group, a heteroarylene group or a divalent cyclic aliphatic hydrocarbon group, $Q^1$ represents a divalent linking group, $C^1$ represents an alkyl group, a cycloalkyl group, an alkoxy group, an alkoxy carbonyl group, an acyl group, or an acyl oxy group, j is 0 or 1, p, q and r each independently represents an integer of 0 to 5, n is an integer of 1 to 3, the sum of the number of $B^1$ and $B^2$ is an integer of 3 to 10, when p, q and r each represent 2 or more, two or more of $B^1$, $Q^1$ and $B^2$ may be the same or different from one another, and when n is 2 or more, two or more of $\{(B^1)_p-(Q^1)_q-(B^2)_r\}$ may be the same or different from one another.

[9]. The liquid crystal composition of any one of claims 1 to 8, wherein the nematic liquid crystal compound substituted with the fluorine atom is a two-frequency driving liquid crystal compound.

[10]. A liquid crystal element comprising a pair of electrodes at least one of which is a transparent electrode, and a liquid crystal layer disposed between the pair of electrodes, wherein the liquid crystal layer contains a liquid crystal composition of any one of claims 1 to 9.

[11]. A liquid crystal composition comprising a siloxane polymer having a liquid crystalline group at the side chain of the polymer, a low molecular-weight liquid crystal compound, and a dichroic dye, wherein the dielectric constant anisotropy of the liquid crystal composition is changed from being positive to being negative when the frequency of a voltage to be applied is increased.

[12]. A liquid crystal composition comprising a siloxane polymer having a liquid crystalline group at the side chain of the polymer, a low molecular-weight liquid crystal compound, and a dichroic dye, wherein the dielectric constant anisotropy of the liquid crystalline group coupled to the siloxane polymer is changed from being positive to being negative when the frequency of a voltage to be applied is increased.

[13]. A liquid crystal composition comprising a siloxane polymer having a liquid crystalline group at the side chain of the polymer, a low molecular-weight liquid crystal compound, and a dichroic dye, wherein the dielectric constant anisotropy of the low molecular-weight liquid crystal is changed from being positive to being negative when the frequency of a voltage to be applied is increased.

[14]. A liquid crystal composition comprising a siloxane polymer having a liquid crystalline group at the side chain of the polymer, a low molecular-weight liquid crystal compound, and a dichroic dye, wherein the dielectric constant anisotropy of the liquid crystalline group coupled to the siloxane polymer and the dielectric constant anisotropy of the low molecular-weight liquid crystal are changed from being positive to being negative when the frequency of a voltage to be applied is increased.

[15]. The liquid crystal composition of any one of [1] to [14], wherein the siloxane polymer contains a repeating unit represented by Formula (11);

Formula (11)

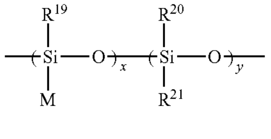

wherein $R^{19}$, $R^{20}$ and $R^{21}$ each independently represent an alkyl group or an aryl group, M represents a liquid crystalline group, x represents a numeral of 3 to 100, y represents a numeral of 0 or more, and when y is 0, the polymer represented by Formula (11) is a homopolymer, and y is not 0, the polymer represented by Formula (11) is a copolymer.

[16]. The liquid crystal display composition of [15], wherein the siloxane polymer contains a repeating unit represented by Formula (12);

Formula (12)

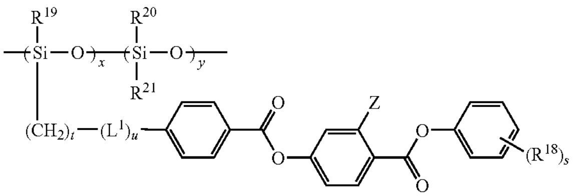

wherein $R^{19}$, $R^{20}$ and $R^{21}$ each independently represents an alkyl group or an aryl group, Z represents a fluorine atom or a chlorine atom, $R^{18}$ represents a hydrogen atom or a substituent, represents a numeral of 1 to 4, t represents a numeral of 2 to 20, u represents 0 or 1, $L^1$ is a divalent linking group, x represents a numeral of 3 to 100, y represents a numeral of 0 or more, and when y is 0, the polymer represented by the Formula (12) is a homopolymer, and y is not 0, the polymer represented by the Formula (12) is a copolymer.

[17]. The liquid crystal composition of [16], wherein $R^{18}$ in Formula (12) is an alkyl group, an alkoxy group, a cyano group, or a halogen atom, and $L^1$ is a sulfur atom or an oxygen atom.

[18]. The liquid crystal composition of any one of claims 11 to 17, wherein the dichroic dye has a substituent represented by Formula (13);

$$-(Het)_j-[(B^1)_p-(Q^1)_q-(B^2)_r]_n-C^1 \quad \text{Formula (13)}$$

wherein Het is an oxygen atom or a sulfur atom, $B^1$ and $B^2$ each independently represent an arylene group, a heteroarylene group, or a divalent aliphatic hydrocarbon group, $Q^1$ represents divalent linking group, $C^1$ represents an alkyl group, a cycloalkyl group, an alkoxy group, an alkoxy carbonyl group, an acyl group or an acyl oxy group, j is 0 or 1, p, q and r each independently represent an integer of 0 to 5, n represents an integer of 1 to 3, the total number of the groups represented by $B^1$ and $B^2$ is an integer of 3 to 10, when p, q and r each represent 2 or more, two or more of $B^1$, $Q^1$ and $B^2$ may be the same or different from one another, and when n is 2 or more, two or more of $\{(B^1)_p-(Q^1)_q-(B^2)_r\}$ may be the same or different from one another.

[19]. The liquid crystal composition any one of [11] to [17], wherein the dichroic dye is a compound represented by Formula (14);

Formula (14)

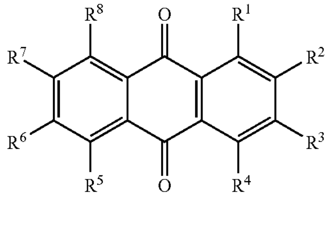

wherein at least one of $R^1$, $R^2$, $R^3$, $R^4$, $R^5$, $R^6$, $R^7$ and $R^8$ is $-(Het)_j-\{(B^1)_p-(Q^1)_q-(B^2)_r\}_n-C^1$, the others each independently represent a hydrogen atom or substituent, Het is an oxygen atom or a sulfur atom, $B^1$ and $B^2$ each independently represent an arylene group, a heteroarylene group or a divalent cyclic aliphatic hydrocarbon group, $Q^1$ is a divalent linking group, $C^1$ is an alkyl group, a cycloalkyl group, an alkoxy group, an alkoxy carbonyl group, an acyl group, or an acyl oxy group, j is 0 or 1, p, q and r each independently represent an integer of 0 to 5, n is an integer of 1 to 3, the sum of the numbers of $B^1$ and $B^2$ is an integer of 3 to 10, when p, q and r each independently represent 2 or more, two or more of $B^1$, $Q^1$ and $B^2$ may be the same or different from one another, and when n represents 2 or more, two or more of $\{(B^1)_p\text{-}(Q^1)_q\text{-}(B^2)_r\}$ may be the same or different from one another.

[20]. The liquid crystal composition of any one of [11] to [17], wherein at least one of the dichroic dyes is a compound represented by Formula (15);

Formula (15)

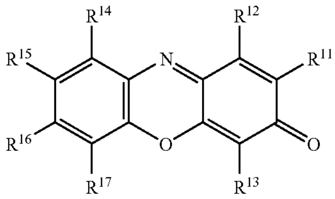

wherein at least one of $R^{11}$, $R^{12}$, $R^{13}$, $R^{14}$, $R^{15}$, $R^{16}$ and $R^{17}$ is $\text{-(Het)}_j\text{-}\{(B^1)_p\text{-}(Q^1)_q\text{-}(B^2)_r\}_n\text{—}C^1$, the others each independently represent a hydrogen atom or a substituent, Het is an oxygen atom or a sulfur atom, $B^1$ and $B^2$ each independently represent an arylene group, a heteroarylene group or a divalent cyclic aliphatic hydrocarbon group, $Q^1$ is a divalent linking group, $C^1$ is an alkyl group, a cycloalkyl group, an alkoxy group, an alkoxy carbonyl group, an acyl group, or an acyl oxy group, j is 0 or 1, p, q and r each independently represent an integer of 0 to 5, n is an integer of 1 to 3, the sum of the numbers of $B^1$ and $B^2$ is an integer of 3 to 10, when p, q and r each represent 2 or more, two or more of $B^1$, $Q^1$, and $B^2$ may be the same or different from one another, and when n is 2 or more, two or more of $\{(B^1)_p\text{-}(Q^1)_q\text{-}(B^2)_r\}$ may be the same or different from one another.

[21]. A liquid crystal element comprising a pair of electrodes, at least one of which is a transparent electrode, and a liquid crystal layer disposed between the pair of electrodes, in which the liquid crystal layer contains a liquid crystal composition of any one of [11] to [20].

[22]. A polymer composed of a repeating unit represented by Formula (12);

Formula (12)

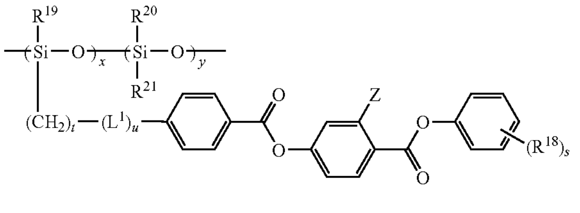

wherein $R^{19}$, $R^{20}$ and $R^{21}$ each independently represent an alkyl group or an aryl group, Z is a fluorine atom or a chlorine atom, $R^{18}$ is a hydrogen atom or a substituent, s is a numeral of 1 to 4, t is a numeral of 2 to 20, u is 0 or 1, $L^1$ is a divalent linking group, x is a numeral of 3 to 100, y is a numeral of 0 or more.

[23]. The polymer of [22], wherein $R^{18}$ in Formula (12) is an alkyl group having 1 to 30 carbon atoms, an alkoxy group having 1 to 30 carbon atoms, a cyano group, or a halogen atom, and $L^1$ is a sulfur atom or an oxygen atom.

BEST MODE FOR CARRYING OUT THE INVENTION

A first aspect of the present invention provides a liquid crystal composition including a siloxane polymer, nematic liquid crystal substituted with at least one fluorine atom, and a dichroic dye, and a liquid crystal element including the liquid crystal composition.

In the process of making the present invention, it has been found that the combination of a polymer, a liquid crystal and a dichroic dye which has been reported has a high viscosity of the liquid crystal composition, resulting in a slow responsive speed. Accordingly, a liquid crystal element was manufactured by combining a siloxane polymer and a nematic liquid crystal substituted with a fluorine atom (hereinafter may be referred to as a fluorinated liquid crystal), and a display having a quick responsive speed was realized. As a result, a higher display performance as compared with conventional liquid crystal compositions was obtained.

By using a two-frequency driving liquid crystal as a liquid crystal in liquid crystal composition, a high responsive speed is obtained, and applicability of the liquid crystal to a moving picture display becomes higher. Further, in the case of the two-frequency driving liquid crystal, the element structure becomes simple, and the manufacturing process thereof can be is simplified since an orientation film is not needed. Since the orientation film is not used, there is no absorption or reflection of light due to the orientation film, and the display performance is higher. In a reflection type display, a high reflectivity can be obtained.

The present invention will be described in detail below. In the following explanation, the range indicated from lower limit to upper limit is inclusive the both limits.

A siloxane polymer according to a first aspect of the present invention is not specified in structure as far as the polymer has a siloxane structure as repeating unit. In particular, the siloxane polymer preferably used in a liquid crystal composition and a liquid crystal element according to the first aspect of the present invention is a siloxane polymer having a repeating unit represented by Formula (1);

Formula (1)

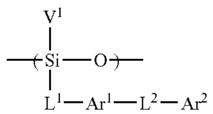

wherein $V^1$ is an alkyl group, a cycloalkyl group, an aryl group or a heteroaryl group. Preferably, $V^1$ is substituted or unsubstituted alkyl group or cycloalkyl group having 1 to 30 carbon atoms, preferably 1 to 12 carbon atoms, or more preferably 1 to 8 carbon atoms, unsubstituted aryl group having 6 to 20 carbon atoms, preferably 6 to 15 carbon atoms, or more preferably 6 to 10 carbon atoms, and substituted or unsubstituted heteroaryl group having 1 to 20 carbon atoms, preferably 2 to 10 carbon atoms, or more preferably 4 to 6 carbon atoms.

These groups may have substituents, and the substituents include the following substituent group V.

(Substituent Group V)

A halogen atom (for example, chlorine, bromine, iodine, fluorine), a mercapto group, a cyano group, a carboxy group, a phosphate group, a sulfo group, a hydroxyl group, a carbamoyl group having 1 to 10 carbon atoms, preferably 2 to 8 carbon atoms, or more preferably 2 to 5 carbon atoms (for example, a methyl carbamoyl group, an ethyl carbamoyl group, a morpholino carbamoyl group), a sulfamoyl group having 0 to 10 carbon atoms, preferably 2 to 8 carbon atoms, or more preferably 2 to 5 carbon atoms (for example, a methyl sulfamoyl group, an ethyl sulfamoyl group, a piperidino sulfonyl group), a nitro group, an alkoxy group having 1 to 20 carbon atoms, preferably 1 to 10 carbon atoms, or more preferably 1 to 8 carbon atoms (for example, a methoxy group, an ethoxy group, a 2-methoxy ethoxy group, a 2-phenyl ethoxy group), an aryl oxy group having 6 to 20 carbon atoms, preferably 6 to 12 carbon atoms, or more preferably 6 to 10 carbon atoms (for example, a phenoxy group, a p-methyl phenoxy group, a p-chlorophenoxy group, a naphthoxy group), an acyl group having 1 to 20 carbon atoms, preferably 2 to 12 carbon atoms, or more preferably 2 to 8 carbon atoms (for example, an acetyl group, a benzoyl group, a trichloroacetyl group), an acyloxy group having 1 to 20 carbon atoms, preferably 2 to 12 carbon atoms, or more preferably 2 to 8 carbon atoms (for example, an acetyloxy group, a benzoyloxy group), an acyl amino group having 1 to 20 carbon atoms, preferably 2 to 12 carbon atoms, or more preferably 2 to 8 carbon atoms (for example, an acetyl amino group), sulfonyl group having 1 to 20 carbon atoms, preferably 1 to 10 carbon atoms, or more preferably 1 to 8 carbon atoms (for example, a methane sulfonyl group, an ethane sulfonyl group, a benzene sulfonyl group), a sulfinyl group having 1 to 20 carbon atoms, preferably 1 to 10 carbon atoms, or more preferably 1 to 8 carbon atoms (for example, a methane sulfinyl group, an ethane sulfinyl group, a benzene sulfinyl group), substituted or unsubstituted amino group having 1 to 20 carbon atoms, preferably 1 to 12 carbon atoms, or more preferably 1 to 8 carbon atoms (for example, an amino group, a methyl amino group, a dimethyl amino group, a benzyl amino group, an anilino group, a diphenyl amino group, a 4-methyl phenyl amino group, a 4-ethyl phenyl amino group, a 3-n-propyl phenyl amino group, a 4-n-propyl phenyl amino group, a 3-n-butyl phenyl amino group, a 4-n-butyl phenyl amino group, a 3-n-pentyl phenyl amino group, a 4-n-pentyl phenyl amino group, a 3-trifluoromethyl phenyl amino group, a 4-trifluoromethyl phenyl amino group, a 3-pyridyl amino group, a 2-pyridyl amino group, a 2-thiazolyl amino group, a 2-oxazolyl amino group, an N,N-methyl phenyl amino group, an N,N-ethyl phenyl amino group).

An ammonium group having 0 to 15 carbon atoms, preferably 3 to 10 carbon atoms, or more preferably 3 to 6 carbon atoms (for example, a trimethyl ammonium group, a triethyl ammonium group), a hydrozino group having 0 to 15 carbon atoms, preferably 1 to 10 carbon atoms, or more preferably 1 to 6 carbon atoms (for example, a trimethyl hydrazino group), a ureido group having 1 to 15 carbon atoms, preferably 1 to 10 carbon atoms, or more preferably 1 to 6 carbon atoms (for example, a ureido group, N,N-dimethyl ureido group), an imido group having 1 to 15 carbon atoms, preferably 1 to 10 carbon atoms, or more preferably 1 to 6 carbon atoms (for example, a succinimido group), an alkylthio group having 1 to 20 carbon atoms, preferably 1 to 12 carbon atoms, or more preferably 1 to 8 carbon atoms (for example, a methylthio group, an ethylthio group, a propiothio group), an arylthio group having 6 to 80 carbon atoms, preferably 6 to 40 carbon atoms, or more preferably 6 to 30 carbon atoms (for example, a phenylthio group, a p-methylphenylthio group, a p-chlorophenylthio group, a 2-pyridylthio group, a 1-naphthylthio group, a 2-naphthyl-thio group, a 4-propyl cyclohexyl-4'-biphenylthio group, a 4-butyl cyclohexyl-4'-biphenylthio group, a 4-pentyl cyclohexyl-4'-biphenylthio group, a 4-propyl phenyl-2-ethynyl-4'-biphenylthio group), a heteroarylthio group having 1 to 80 carbon atoms, preferably 1 to 40 carbon atoms, or more preferably 1 to 30 carbon atoms (for example, a 2-pyridylthio group, a 3-pyridylthio group, a 4-pyridylthio group, a 2-quinolylthio group, a 2-furylthio group, a 2-pyrrolylthio group), an alkoxy carbonyl group having 2 to 20 carbon atoms, preferably 2 to 12 carbon atoms, or more preferably 2 to 8 carbon atoms (for example, a methoxy carbonyl group, an ethoxy carbonyl group, a 2-benzyloxy carbonyl group), an aryloxy carbonyl group having 6 to 20 carbon atoms, preferably 6 to 12 carbon atoms, or more preferably 6 to 10 carbon atoms (for example, a phenoxy carbonyl group), an unsubstituted alkyl group having 1 to 18 carbon atoms, preferably 1 to 10 carbon atoms, or more preferably 1 to 5 carbon atoms (for example, a methyl group, an ethyl group, a propyl group, a butyl group), a substituted alkyl group having 1 to 18 carbon atoms, preferably 1 to 10 carbon atoms, or more preferably 1 to 5 carbon atoms (for example, a hydroxy methyl group, a trifluoromethyl group, a benzyl group, a carboxy ethyl group, an ethoxy carbonyl methyl group, an acetyl amino methyl group, and the a substituted alkyl group includes unsaturated hydrocarbon group having 2 to 18 carbon atoms, preferably 3 to 10 carbon atoms, or more preferably 3 to 5 carbon atoms (for example, a vinyl group, an ethynyl group, a 1-cyclohexenyl group, a benzylidine group, a benzylidene group)), an aryl group having 6 to 20 carbon atoms, preferably 6 to 15 carbon atoms, or more preferably 6 to 10 carbon atoms (for example, a phenyl group, a naphthyl group, a p-carboxy phenyl group, a p-nitro phenyl group, a 3,5-dichlorophenyl group, a p-cyano phenyl group, a m-fluorophenyl group, a p-tolyl, 4-propyl cyclohexyl-4'-biphenyl group, a 4-butyl cyclohexyl-4'-biphenyl group, a 4-pentyl cyclohexyl-4-biphenyl group, a 4-propyl phenyl-2-ethyl-4'-biphenyl group), and a heteroaryl group having 1 to 20 carbon atoms, preferably 2 to 10 carbon atoms, or more preferably 4 to 6 carbon atoms (for example, pyridyl group, a 5-methylpyridyl group, a thienyl group, furyl group, a morpholino group, a tetrahydro furfuryl group).

These substituent groups V can form a structure condensing with a benzene ring or a naphthalene ring. These substituents may be further substituted with other substituents explained in the description about the substituent group V in the above.

Substituents for an alkyl group or a cycloalkyl group represented by $V^1$ are preferably, among substituents V, a hydroxyl group, a halogen atom (a fluorine atom, chlorine atom, bromine atom, iodine atom), an aryl group (a phenyl group, a naphthyl group or the like), an alkoxy group (a methoxy group, an ethoxy group or the like), and an aryloxy group (a phenoxy group or the like), and more preferably a hydroxyl group, a halogen atom (a fluorine atom, chlorine atom, bromine atom, iodine atom), and an aryl group (in particular, a phenyl group, a naphthyl group).

Substituents for an aryl group represented by $V^1$ are preferably, among substituents V, a carboxyl group, a nitro group, a halogen atom (a fluorine atom, chlorine atom, bromine atom, iodine atom), a cyano group, an alkyl group (a methyl group, an ethyl group or the like), an alkoxy group (a methoxy group, an ethoxy group or the like), and an aryloxy group (a phenoxy group or the like), and more preferably a carboxyl group, a nitro group, a halogen atom (a fluorine atom, a chlorine atom, a bromine atom, an iodine atom), and a cyano group.

Substituents for a heteroaryl group represented by $V^1$ are preferably, among substituents V, a carboxyl group, a nitro group, a halogen atom (a fluorine atom, a chlorine atom, a bromine atom, an iodine atom), a cyano group, an alkyl group (a methyl group, ethyl group or the like), an alkoxy group (methoxy group, ethoxy group or the like), and an aryloxy group (phenoxy group or the like), and more preferably carboxyl group, a nitro group, a halogen atom (fluorine atom, chlorine atom, bromine atom, iodine atom), and a cyano group.

Specific examples of an alkyl group and a cycloalkyl group represented by $V^1$ are preferably a methyl group, an ethyl group, a propyl group, a butyl group, a tert-butyl group, an i-butyl group, a s-butyl group, a pentyl group, a tert-pentyl group, a hexyl group, a heptyl group, an octyl group, a cyclohexyl group, a 4-methyl cyclohexyl group, a 4-ethyl cyclohexyl group, a 4-propyl hexyl group, a 4-butyl cyclohexyl group, a 4-pentyl cyclohexyl group, a hydroxy methyl group, a trifluoromethyl group, and a benzyl group.

Specific examples of an aryl group represented by $V^1$ are preferably a phenyl group, a naphthyl group, a p-carboxy phenyl group, a p-nitrophenyl group, a 3,5-dichlorophenyl group, a p-cyanophenyl group, a m-fluorophenyl group, and a p-tolyl group.

Specific examples of a heteroaryl group represented by $V^1$ are preferably a pyridyl group, a 5-methylpyridyl group, a thienyl group, and a furyl group.

$V^1$ is preferably alkyl group and aryl group, and more preferably an unsubstituted alkyl group and aryl group, and particularly preferably methyl, ethyl, butyl, hexyl, and phenyl groups.

$L^1$ and $L^2$ each represent a divalent linking group, and are preferably a linking group composed of an atomic group containing at least one atom selected from the group consisting of carbon atom, nitrogen atom, sulfur atom, and oxygen atom. The divalent linking group represented by $L^1$ and $L^2$ include an alkylene group, an alkenylene group, an alkynylene group, an amide group, an ether group, an ester group, a sulfoamide group, a sulfonic acid ester group, a ureido group, a sulfonyl group, a sulfinyl group, a thioether group, a carbonyl group, a —NR— group (R represents a hydrogen atom, an alkyl group, or an aryl group), an azo group, an azoxy group, and other divalent linking groups having 0 to 60 carbon atoms, and more preferably 0 to 30 carbon atoms constituted by combining one or more heterocyclic divalent groups.

An alkylene group represented by $L^1$ and $L^2$ has preferably 1 to 20 carbon atoms, more preferably 1 to 10 carbon atoms, and includes, for example, a methylene group, an ethylene group, a propylene group, a butylene group, a pentylene group, and a cyclohexyl-1,4-diyl group.

An alkenylene group represented by $L^1$ and $L^2$ has preferably 2 to 20 carbon atoms, more preferably 2 to 10 carbon atoms, and includes, for example, an ethenylene group.

An alkenylene group represented by $L^1$ and $L^2$ has preferably 2 to 20 carbon atoms, more preferably 2 to 10 carbon atoms, and includes, for example, an ethynylene group.

In —NR— group represented by $L^1$ and $L^2$, alkyl group and aryl group represented by R includes those shown in substituent group V.

A heterocyclic ring divalent group represented by $L^1$ and $L^2$ includes, for example, a piperazine-1,4-diyl group.

A divalent linking group represented by $L^1$ includes preferably an alkylene group, an alkenylene group, an alkynylene group, an ether group, a thioether group, an amide group, an ester group, a carbonyl group, and a group having combination thereof, and more preferably $L^1$ is an alkylene group, an alkylene ether group, and an alkylene ester group. Particularly preferred group is an alkylene ether, and more particularly, an alkylene ether having 1 to 20 carbon atoms, and still more preferably 1 to 10 carbon atoms is preferred.

A divalent linking group represented by $L^2$ is preferably an ester group.

$L^1$ and $L^2$ may further have substituents, and the substituents include the above-described substituent groups V. Substituents are preferably not contained.

$Ar^1$ and $Ar^2$ each represent an aryl group or a heteroaryl group, which include an aryl group and a heteroaryl group as the above-described $V^1$.

$Ar^1$ is preferably an unsubstituted phenyl group, or a phenyl group substituted with a halogen atom or an alkyl group.

Preferred examples of $Ar^2$ include a phenyl group substituted at the 4 position, substituent at 4 position includes an alkyl group, a cycloalkyl group, an alkoxy group, an alkoxy carbonyl group, an acyl group, a cyano group, a halogen atom or an acyl oxy group, and more preferably an alkyl group, a halogen atom, an alkoxy group, and a cycloalkoxy group, and specific examples are a methyl group, a methoxy group, an ethyl group, an ethoxy group, a propyl group, a propoxy group, a butyl group, a butoxy group, a pentyl group, a pentyloxy group, a hexyl group, a hexyloxy group, a heptyl group, heptyloxy group, a fluorine atom, a chlorine atom, a cyclohexyl group, and a cyclopentyl group. More preferable examples are an alkyl group, an alkoxy group, and a cycloalkyl group, specific examples are a methyl group, a methoxy group, an ethyl group, an ethoxy group, a propyl group, a propoxy group, a butyl group, a butoxy group, a pentyl group, a pentyloxy group, a hexyl group, a hexyloxy group, a heptyl group, a heptyloxy group, a cyclohexyl group, and a cyclopentyl group.

The molecular weight of the siloxane polymer composed of repeating units represented by Formula (1) in the first aspect of the present invention is not specifically limited in, but is preferably in the range of number-average molecular weight of 100 to 100,000, or more preferably in the range of 500 to 10,000.

The siloxane polymer in the first aspect of the present invention may be either a homopolymer or a heteropolymer.

The siloxane polymer in the first aspect of the present invention may be a linear, branched or cyclic polymer, but is preferably a linear polymer.

Specific examples of the siloxane polymer composed of repeating units represented by Formula (1) are shown below, but the present invention is not limited to these examples.

No.1
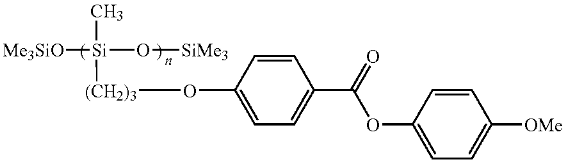
No.2
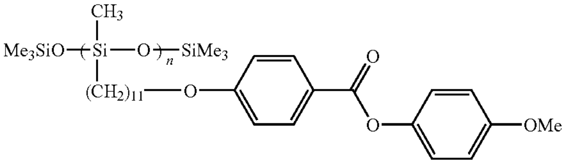
No.3
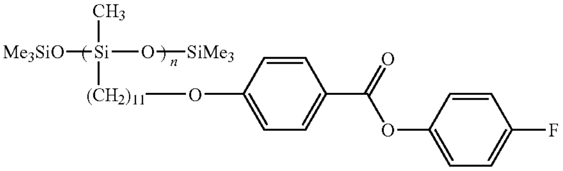
No.4
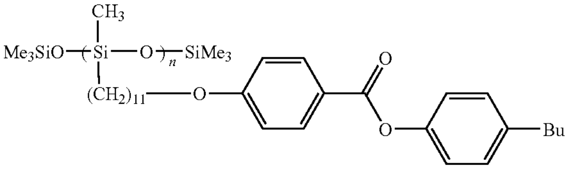
No. 5
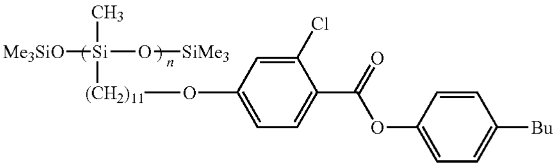
No.6
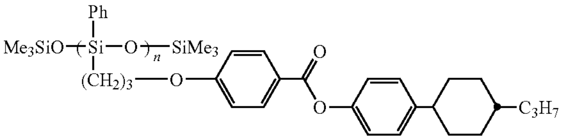
No.7
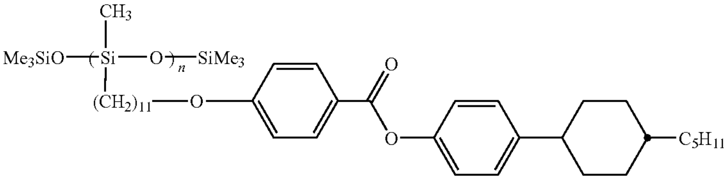
No.8
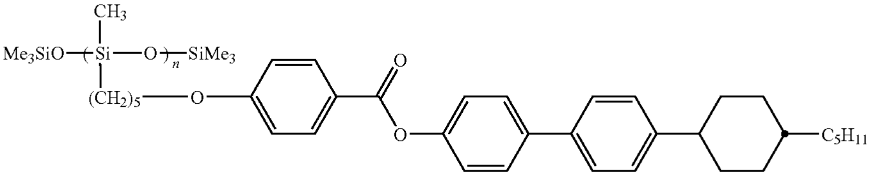
No.9
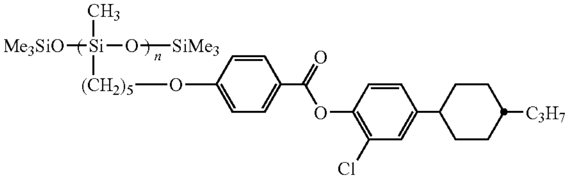
No.10
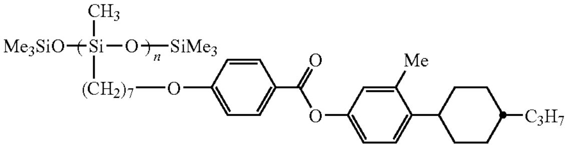
No.11
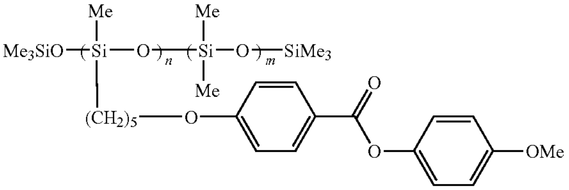
No.12
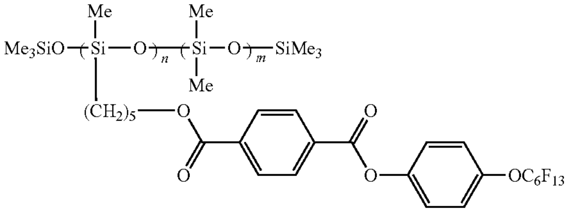
No.13
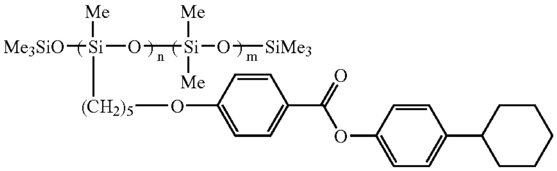
No.14
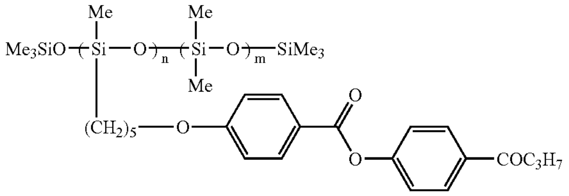

The siloxane polymer composed of repeating units represented by Formula (1) can be synthesized by combining known methods. For example, a hydrogen-containing siloxane polymer and an ethylene-based compound may be subjected to an by addition reaction, but the present invention is not limited thereto.

In the liquid crystal composition of the first aspect of the present invention, two or more types of the siloxane polymer composed of repeating units represented by Formula (1) may be used in combination.

In the first aspect of the present invention, the nematic liquid crystal compound substituted with a fluorine atom is a liquid crystal compound which exhibits a nematic phase, and at least one hydrogen atom of the nematic liquid crystal compound is substituted with a fluorine atom. The molecular weight of the compound is preferably 50 to 1000, or more preferably 100 to 500.

Specific examples of the nematic liquid crystal compound include a fluorine-substituted azomethine compound a fluorine-substituted cyanobiphenyl compound, a fluorine-substituted cyanophenyl ester, a fluorine-substituted phenyl ester, a fluorine-substituted cyclohexane carboxylic phenyl ester a fluorine-substituted, phenyl cyclohexane, a fluorine-substituted phenyl pyrimidine, a fluorine-substituted alkoxy substituted phenyl pyrimidine, and a fluorine-substituted tran-type compound. Examples are liquid crystals manufactured by Merck & Co., Inc. (ZLI-4692, ZLI-5081, MLC-6267, 6284, 6287, 6288, 6406, 6422, 6423, 6425, 6435, 6437, 7700, 7800, 9000, 9100, 9200, 9300, 10000), and liquid crystals manufactured by Chisso Corporation (LIXON5036xx, 5037xx, 5039xx, 5040xx, 5041xx).

In the fluorinated liquid crystal of the first aspect of the present invention, from the viewpoint of enhancing a responsiveness to an electric field, the absolute value $|\Delta\epsilon|$ of the dielectric constant anisotropy is preferably in the range of 1 to 20, or more preferably 2 to 15.

The first aspect of the present invention provides a guest-host type liquid crystal composition using a dichroic dye, and as the host liquid crystal, a mixture of the fluorinated liquid crystal and the siloxane polymer may be used. The dielectric constant anisotropy of the host liquid crystal used in the first aspect of the present invention may be either positive or negative, but is preferably positive.

When the host liquid crystal having a positive dielectric constant anisotropy is oriented horizontally, the liquid crystal is oriented horizontally when no voltage is applied thereto, and the dichroic dye is also horizontally oriented and absorbs light. On the other hand, since the liquid crystal molecule is oriented vertically when voltage is applied, and the dichroic dye is also oriented vertically, and the light is transmitted. That is, the mode becomes a white display mode when voltage is applied, and a black display mode when no voltage is applied.

In the guest-host type liquid crystal of the first aspect of the present invention, the fluorinated liquid crystal is also preferably be a two-frequency driving liquid crystal compound substituted with a fluorine. In the liquid crystal element of the first aspect of the present invention, by using the two-frequency driving liquid crystal, a change of the orientation can reversibly be performed without using an orientation film. The two-frequency driving liquid crystal is a liquid crystal which shows a positive dielectric constant anisotropy when the frequency of an electric field applied to the liquid crystal is in a low frequency region, and inverted to a negative dielectric constant anisotropy when the frequency of an electric field applied to the liquid crystal is in a high frequency region. A specific example is a two-frequency driving liquid crystal substituted with a fluorine disclosed in the publication (Nicholas, Robert Tudor, Ph.D. Thesis, Hull University, 1988).

Fluorinated Liquid Crystal 1

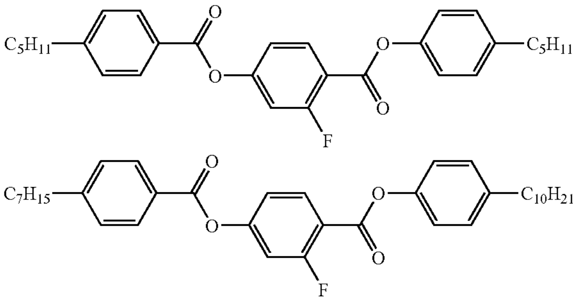

(Mixture of 1:1)

The two-frequency driving liquid crystal compound used in the first aspect of the present invention may be a mixture of plural liquid crystal compounds. Further, it may also contain a liquid crystal compound which does not invert the polarity of a dielectric constant anisotropy between a high frequency region and a low frequency region of the electric field to be applied.

A second aspect of the present invention provides a liquid crystal composition including a siloxane polymer having a liquid crystalline group at the side chain of the polymer (hereinafter referred to as a liquid crystalline siloxane polymer), a low molecular-weight liquid crystal, and a dichroic dye, which changes the dielectric constant anisotropy from being positive to being negative by increasing the frequency of the voltage to be applied, and a liquid crystal element including the liquid crystal composition.

In the guest-host system using liquid crystal polymer which has been reported, the dielectric constant anisotropy of the side chain liquid crystalline group is largely positive, and even if the frequency of the voltage to be applied is increased, the polarity of the dielectric constant anisotropy of the liquid crystal composition is not changed, and it is found that the liquid crystal is difficult to be driven at two frequencies. Accordingly, in the guest-host system using a liquid crystal polymer, it has been intensively studied to be able to driving the liquid crystal at two frequencies, and it is has been found that the use of a siloxane polymer having liquid crystalline groups at the side chain of the polymer is extremely effective, leading to the completion of the present invention.

The second aspect of the present invention is more specifically described below. In the following explanation, the range from the lower limit to the upper limit is inclusive the both limits.

The liquid crystal composition of the second aspect of the present invention includes a siloxane polymer having liquid crystalline groups at the side chain of the polymer, a low molecular-weight liquid crystal, and a dichroic dye, and the dielectric constant anisotropy of the composition changes from being positive to being negative with an increase in the frequency of the voltage to be applied. In the liquid crystal composition, at least one of the siloxane polymer and a low molecular-weight liquid crystal shows a two-frequency driving characteristic, and preferably both the siloxane polymer and the low molecular-weight liquid crystal show a two-frequency driving characteristic.

By using such a two-frequency driving liquid crystal, the responsive speed is faster and suitability to a moving picture display becomes higher. Further, in the case of the two-frequency driving liquid crystal, an orientation film is not needed, and the element structure is simple, and the manufacturing process thereof can be simplified. When an orientation film is not provided, there is no absorption or reflection of light due to the orientation film, and the display performance is higher. In a reflection type display, a high reflectivity can be obtained.

Various materials used in the second aspect of the present invention will be described below.

In the second aspect of the present invention, the siloxane polymer (liquid crystalline siloxane polymer) is the siloxane polymer which has a main chain skeleton of the polymer, and has a crystallinity at the side chain portion branched from the polymer. The siloxane polymer preferably contains a repeating unit represented by Formula (11);

Formula (11)

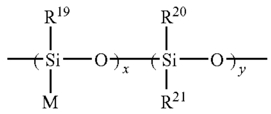

wherein $R^{19}$, $R^{20}$ and $R^{21}$ each independently represent an alkyl group or an aryl group, which may have a substituent.

The alkyl group is preferably an alkyl group having 1 to 30 carbon atoms, more preferably, 1 to 14 carbon atoms, or still more preferably 1 to 4 carbon atoms. For example, the alkyl group includes a methyl group, an ethyl group, an n-propyl group, an isopropyl group, an n-butyl group, an s-butyl group, a t-butyl group, a 2-chloroethyl group, and a 2-cyanoethyl. group. The alkyl group may be straight, branched, or cyclic, which may have a substituent or may be unsubstituted.

The alkyl group includes a cycloalkyl group, and the cycloalkyl group is preferably a cycloalkyl group having 6 to 36 carbon atoms, more preferably 7 to 24 carbon atoms, and still more preferably, 9 to 14 carbon atoms, for example, a cyclohexyl group, a cyclopentyl group, a 4-n-methyl cyclohexyl group, a 4-n-ethyl cyclohexyl group, and a 4-n-butyl cyclohexyl group.

The aryl group is preferably an aryl group having 6 to 20 carbon atoms, more preferably, 6 to 15 carbon atoms, and still more preferably, 6 to 12 carbon atoms, for example, a phenyl group, a p-tolyl group, a naphthyl group, a p-cyanophenyl group, a p-fluorophenyl group, and an m-chlorophenyl group.

The aryl group may have a substituent or may be unsubstituted.

The substituent includes the substituent group V mentioned in the first aspect of the present invention.

Substituents for the alkyl group and cycloalkyl group represented by $R^{19}$, $R^{20}$ and $R^{21}$ are preferably, among the substituent group V, a halogen atom, a cyano group, an alkoxy group, an aryloxy group, an acyloxy group, an amino group, an ammonium group, an alkoxy carbonyl group, an aryloxy carbonyl group, an aryl group, and a heteroaryl group.

Substituents for the aryl group represented by $R^{19}$, $R^{20}$ and $R^{21}$ are preferably, among the substituent group V, a halogen atom, a cyano group, an alkoxy group, an acyl group, an acyl oxy group, an acylamino group, an amino group, an alkoxy carbonyl group, an aryloxy carbonyl group, an unsubstituted alkyl group, a substituted alkyl group, aryl group, and a heteroaryl group.

The alkyl group and aryl group represented by $R^{19}$, $R^{20}$ and $R^{21}$ are particularly preferably a methyl group and a phenyl group.

In Formula (11), M represents a liquid crystalline group. The liquid crystalline group denotes a structure having several phenyl groups or a cyclic structure, and may be any phase, but is preferably a structure similar to a liquid crystal compound to form a nematic phase and a smectic phase. Specific examples of the liquid crystal compound are listed in Chapter 3 "Molecular structure and liquid crystalline property" in Liquid Crystal Handbook edited by Liquid Crystal Handbook Editorial Committee, 2000, published by Maruzen Company, Limited Ltd.

M is preferably a group which allows to vary the dielectric constant anisotropy of a liquid crystal compound from being positive to being negative with increase in the frequency of the voltage to be applied, and such a liquid crystal compound is specifically described in Liquid Crystal Device Handbook, edited by Committee 142 of Japan Society for the Promotion of Science, Nikkan Kogyo Shimbunsha, 1989, pp. 189-192.

Preferably, M has a structure represented by Formula (16);

$$*\text{—}(CH_2)_t\text{-}(L^1)_u\text{-}(Cy^1)\text{-}(L^2)_v\text{-}(Cy^2)\text{-}(L^3)_w\text{-}(Cy^3)\text{-}(L^4)_x\text{-}(Cy^4)_y \quad \text{Formula (16)}$$

wherein * denotes the linking position with the siloxane polymer.

$L^1$ is a divalent linking group, preferably a sulfur atom and an oxygen atom, and more preferably an oxygen atom.

$L^2$ to $L^4$ each represent an ester linking group. Herein, the ester linking group may be either —$CO_2$— or =—OCO—.

$Cy^1$ to $Cy^4$ each independently represent a divalent aryl group, a divalent heteroaryl group, or a divalent cyclic aliphatic hydrocarbon group.

The divalent aryl group is preferably an aryl group having 6 to 20 carbon atoms, or more preferably 6 to 10 carbon atoms. Preferred examples of the aryl group include a benzene ring and a naphthalene ring. The benzene ring and substituted benzene ring are particularly preferable, and 1,4-phenylene group is more preferable.

The divalent heteroaryl group is preferably a heteroaryl group having 1 to 20 carbon atoms, more preferably 2 to 9 carbon atoms, for example, a pyridine ring, a quinoline ring, an isoquinoline ring, a pyrimidine ring, a pyrazine ring, a thiophene ring, a furan ring, an oxazole ring, a thiazole ring, an imidazole ring, a pyrazole ring, an oxadiazole ring, a thiadiazole ring, a triazole ring, and a condensed heteroaryl group thereof.

The divalent cyclic hydrocarbon group is preferably a cyclic hydrocarbon group having 3 to 20 carbon atoms, or more preferably 4 to 10 carbon atoms. Preferred examples are a cyclohexane diyl group and a cyclopentane diyl group, for example, a cyclohexane-1,2-diyl group, a cyclohexane-1,3-diyl group, a cyclohexane-1,4-diyl group, and a cyclopentane-1,3-diyl group, (E)-cyclohexane-1,4-diyl is particularly preferred.

$Cy^1$ to $Cy^4$ each independently represent a divalent aryl groups, and particularly preferably a divalent benzene ring.

The divalent aryl group, divalent heteroaryl group or divalent cyclic aliphatic hydrocarbon group represented by $Cy^1$ to $Cy^4$ may further have substituents. The substituents include a substituent group V mentioned above. Preferred examples of the substituents are an alkyl group, an alkoxy group, a halogen atom, and a cyano group.

t is an integer of 2 to 20, preferably 3 to 18, or more preferably 8 to 15. u, x and y each independently represent 0 or 1. v and w each independently represent 0 or 1, and at least one of v and w is 1.

Preferable combinations of v, w, x, and y are as follows.

(i) v=1, w=1, x=0, y=0

(ii) v=1, w=0, x=0, y=0

(iii) v=0, w=1, x=0, y=0

(iv) v=0, w=1, x=0, y=1

(v) v=1, w=1, x=1, y=1

A more preferable combination is (i).

M has preferably a structure represented by Formula (17);

Formula (17)

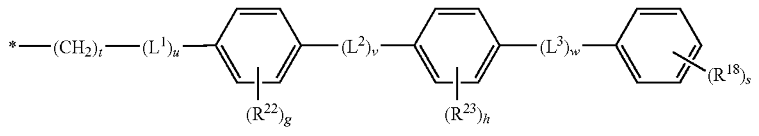

$R^{18}$, $R^{22}$ and $R^{23}$ each independently represent a hydrogen atom or a substituent. The substituent is selected from the substituent group V as described above. The substituent group includes preferably an alkyl group, an alkoxy group, a cyano group, and a halogen atom, and these substituent groups may have a substituent.

The alkyl group (including cycloalkyl group) has preferably 1 to 30 carbon atoms, more preferably 1 to 18 carbon atoms, and most preferably 1 to 14 carbon atoms, and includes, for example, a heptyl, octyl, nonyl, decyl, undecyl, dodecyl, 4-pentyl cyclohexyl, and trifluoromethyl groups.

The alkoxy group has preferably 1 to 30 carbon atoms, more preferably 1 to 18 carbon atoms, and most preferably 1 to 14 carbon atoms, and includes, for example, a pentyloxy, hexyloxy, heptyloxy, octyloxy, nonyloxy, decyloxy, undecyloxy, dodecyloxy, and 3-butyloxy propyloxy groups.

As a halogen atom, a fluorine atom or a chlorine atom is preferred.

s, g and h each independently represent a numeral of 1 to 4, preferably 1 to 3, or more preferably 1 to 2.

In Formula (17), $L^1$ to $L^4$, u, v and w are the same as $L^1$ to $L^4$, u, v and w in Formula (16), and the preferred range is also the same.

M has preferably a structure represented by Formula (18);

Formula (18)

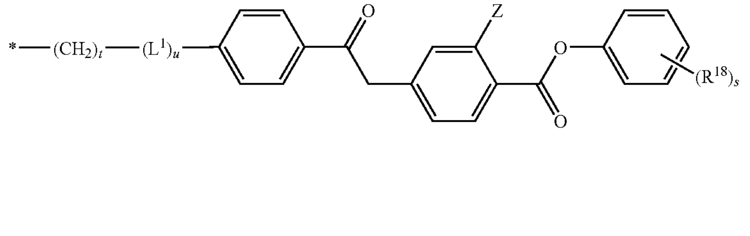

Z represents a fluorine atom or a chlorine atom.

$R^{18}$ and s are the same as $R^{18}$ and s in Formula (17), and the preferred range is also the same. At least one of $R^{18}$ is preferably positioned at the para-position with respect to the ester group.

$L^1$, t and u are the same as $L^1$, t and u in Formula (16), and the preferred range is also the same.

In Formula (11), x is a numeral of 3 to 100, and preferably 3 to 50.

y is a numeral of 0 or more, preferably 0 to 1,000, more preferably 0 to 100, and most preferably 0 to 50. In Formula (11), when y is 0, the polymer is a homopolymer, and when y is not 0, the polymer is a copolymer.

In the siloxane polymer represented by Formula (12), $R^{18}$, $R^{19}$, $R^{20}$, $R^{21}$, x, y, t, U, S, $L^1$, and z are the same as explained in Formulas (11) and (16) to (18).

In the liquid crystalline siloxane polymer in the second aspect of the present invention, the molecular weight is not particularly limited, but preferably the number-average molecular weight is in the range of 1,000 to 100,000, or preferably 2,000 to 50,000. The liquid crystalline siloxane polymer may be either a homopolymer or a copolymer, and the structure thereof may be linear, branched, crosslinked, or cyclic.

Specific examples of the liquid crystalline siloxane polymer in the second aspect of the present invention are shown below, but the present invention is not limited to these examples.

(1)
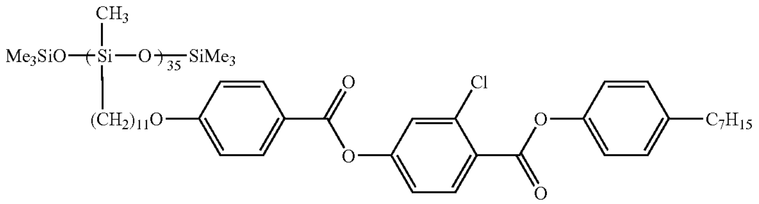
(2)
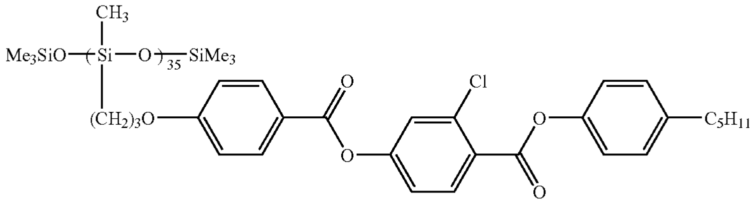
(3)
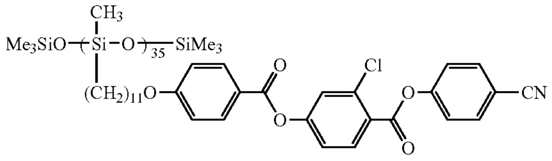
(4)
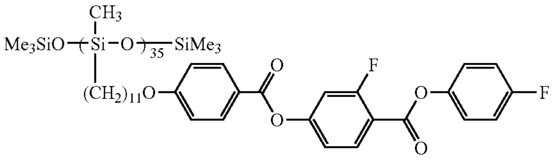
(5)
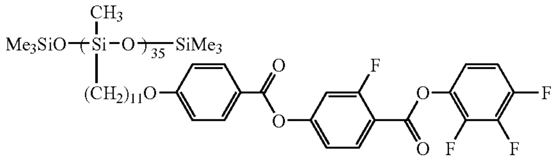
(6)
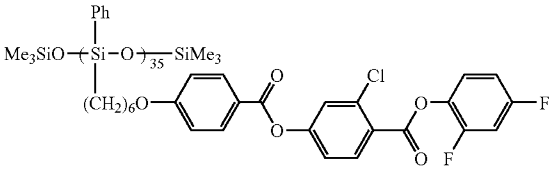
(7)
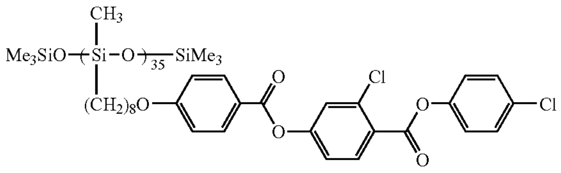
(8)
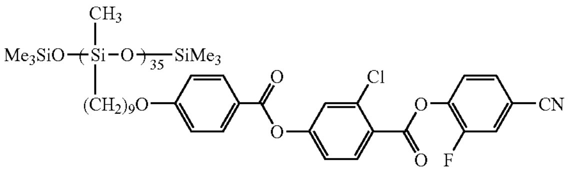
(9)
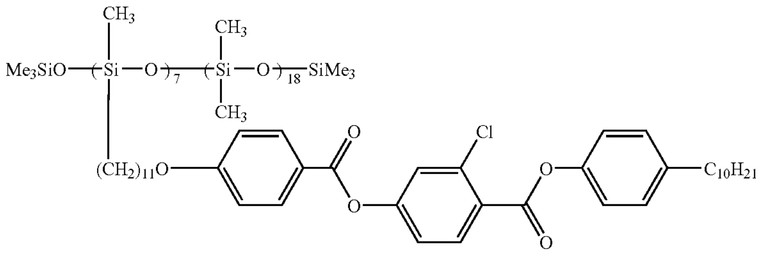
(10)
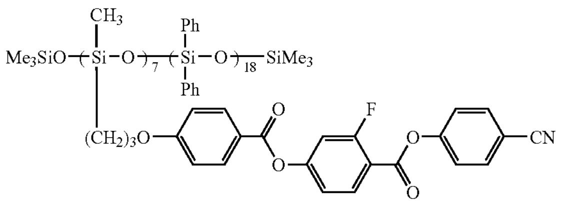
(11)
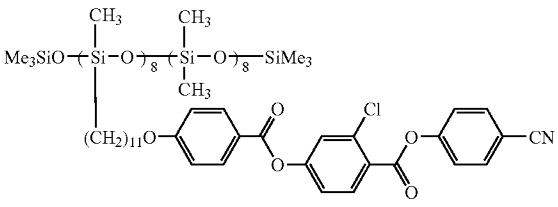

-continued (12)

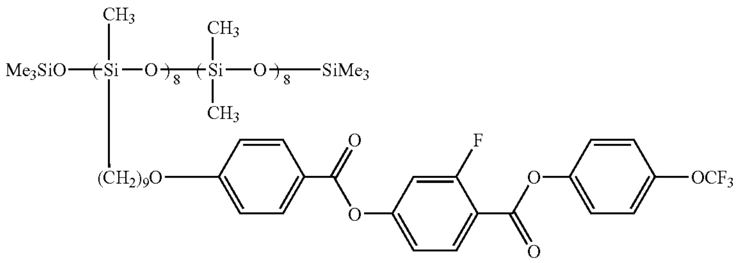

The liquid crystalline siloxane polymer is synthesized by a hydrosilylation reaction between a polysilane compound having Si—H group and a side chain liquid crystalline compound having an unsaturated bond at the terminal end thereof. The side chain liquid crystalline compound having an unsaturated bond at the terminal end thereof is synthesized by the use of a general organic synthesizing technique. An amount of the side chain liquid crystalline compound having an unsaturated bond at the terminal end is 100 mole % to 200 mole % relative to the Si—H radical in the polysilane, preferably 100 mole % to 150 mole %, and more preferably 100 mole % to 120 mole %.

A catalyst used in the hydrosilylation reaction is Pt or Rh compound, including $H_2PtCl_6$, dichlorodicyclopentadienyl platinum ($Cp_2PtCl_2$), ($CH_2$=$CHSiMe_2OSiMe_2CH$=$CH_2)_2Pt$ (Karstedt reagent). The amount of the catalyst is 0.01 mole % to 10 mole % with respect to the side chain liquid crystal compound having an unsaturated bond at the terminal end, and preferably 0.1 mole % to 5 mole %.

The solvent used in the reaction includes toluene, xylene, THF, ethyl acetate, chlorobenzene, and dichlorobenzene, and they may be used either alone or in combination. Toluene, xylene, chlorobenzene, and dichlorobenzene are preferably used, and toluene and xylene are particularly preferable.

The amount of the solvent is 1 to 10,000 times the weight of the polysilane, preferably 10 to 1000 times, and more preferably 50 to 500 times.

The reaction temperature is 50° C. to the boiling point of the solvent, preferably 50 to 100° C., or more preferably 60 to 90° C.

The reaction time varies with the reactivity of the side chain liquid crystal compound having an unsaturated bond at the terminal end thereof to be used, and is generally about 1 minute to 1 day, preferably 10 minutes to 12 hours, and more preferably 1 hour to 6 hours.

A resultant liquid crystalline siloxane polymer is purified by a silica gel chromatograph, a recrystallization method or a reprecipitation method, and these methods may be carried out either alone or in combination depending on the physical properties of the obtained polymer.

Next, the low molecular-weight liquid crystal in the second aspect of the present invention will be described below.

The low molecular-weight liquid crystal refers to a liquid crystal having a molecular weight of 100 to 1,000. The phase of the low molecular-weight liquid crystal is not specifically limited, but a nematic phase or a smectic phase is preferred.

Specific examples of the liquid crystal composition include those described in Chapter 3 "Molecular structure and liquid crystalline property" in Liquid Crystal Handbook edited by Liquid Crystal Handbook Editorial Committee, 2000, published by Maruzen Company, Limited Ltd. Compound having functions of controlling the orientation state of a dichroic dye dissolved as a guest by changing the orientation state by the action of an electric field.

Specific examples include an azomethine compound, a cyanobiphenyl compound, a cyanophenyl ester, a fluorine-substituted phenyl ester, a cyclohexane carboxylic phenyl ester, a fluorine-substituted cyclohexane carboxylic phenyl ester, a cyanophenyl cyclohexine, a fluorine-substituted phenyl cyclohexane, a cyano-substituted phenyl pyrimidine, a fluorine-substituted phenyl pyrimidine, an alkoxy substituted phenyl pyrimidine, an alkoxy substituted phenyl pyrimidine substituted with a fluorine, a phenyl dioxane, a tran-type compound, a tran-type compound substituted with a fluorine, and an alkenyl cyclohexyl benzonitrile. Further, liquid crystal compounds described in Liquid Crystal Device Handbook, edited by Committee 142 of Japan Society for the Promotion of Science, Nikkan Kogyo Shimbunsha, 1989, pp. 154-192, and pp. 715-722 may be used. It is also possible to use a host liquid crystal substituted with a fluorine suitable for the TFT drive. Examples are liquid crystals manufactured by Merck & Co., Inc. & Co., Inc. (ZLI-4692, MLC-6267, 6284, 6287, 6288, 6406, 6422, 6423, 6425, 6435, 6437, 7700, 7800, 9000, 9100, 9200, 9300, 10000 or the like), and liquid crystals manufactured by Chisso Corporation (LIXON5036xx, 5037xx, 5039xx, 5040xx, 5041xx or the like).

The low molecular-weight liquid crystal in the second aspect of the present invention is preferably a two-frequency driving liquid crystal compound. The two-frequency driving liquid crystal is a liquid crystal which shows a positive dielectric constant anisotropy when the frequency of an electric field applied to the liquid crystal is in a low frequency region, and inverted to a negative dielectric constant anisotropy when the frequency of an electric field applied to the liquid crystal is in a high frequency region, which is specifically described in Liquid Crystal Device Handbook, edited by Committee 142 of Japan Society for the Promotion of Science, Nikkan Kogyo Shimbunsha, 1989, pp. 189-192.

As specific examples of the two-frequency driving liquid crystal compound, the two-frequency driving liquid crystal of Eastman-Kodak Company is shown below;

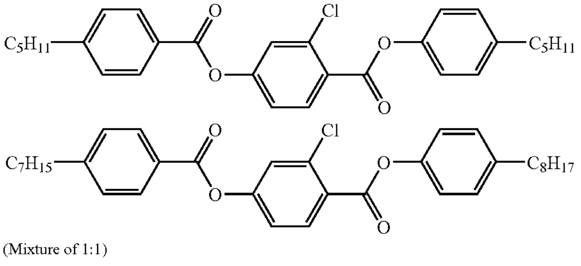

(Mixture of 1:1)

Other commercially available examples of the two-frequency driving liquid crystal material include DF-02XX, DF-05XX, FX-1001, FX-002 manufactured by Chisso Corporation, and MLC-2048 manufactured by Merck & Co., Inc. The two-frequency driving liquid crystal compound usable in the second aspect of the present invention may be a mixture of plural liquid crystal compounds.

The second aspect of the present invention provides a liquid crystal composition of guest-host type using a dichroic dye, and a mixture of a liquid crystalline siloxane polymer and a low molecular-weight liquid crystal can be used as a host liquid crystal. For the purpose of changing the physical properties (for example, temperature range of liquid crystal phase, dielectric constant anisotropy, refractive index anisotropy, or crossover frequency) of the host liquid crystal, a compound which does not exhibit a liquid crystallinity may be also added. Herein, the crossover frequency refers to a frequency at which the dielectric constant anisotropy changes from being positive to being negative in a two-frequency driving liquid crystal.

The liquid crystal composition in the second aspect of the present invention may also contain other compounds such as an ultraviolet absorber or an antioxidant.

The liquid crystal composition in the second aspect of the present invention may also contain a chiral compound. The chiral compound is an optically active substance, which imparts a chiral nematic phase to a liquid crystal composition by adding the chiral compound to the host liquid crystal material. Examples thereof include chiral agents for TN and STN described in Liquid Crystal Device Handbook, edited by Committee 142 of Japan Society for the Promotion of Science, Nikkan Kogyo Shimbunsha, 1989, pp. 199-202.

The ratio of a low molecular-weight liquid crystal to a liquid crystalline siloxane polymer in the liquid crystal composition in the second aspect of the present invention is not particularly limited, but is preferably 20 moles: 80 moles to 80 moles: 20 moles, more preferably 70 moles: 30 moles to 30 moles: 70 moles, or most preferably 60 moles: 40 moles to 40 moles: 60 moles The dichroic dye in the present invention will be described.

The dichroic dye of the present invention is a dichroic dye used generally in a guest-host system. The dichroic dye is defined as a compound which is dissolved in a host liquid crystal to exhibit a function of absorbing light. The maximum light-absorbing wavelength and light-absorbing band of the dichroic dye of the present invention is not specifically limited, but it is preferred to have an absorption maximum in the yellow region (Y), magenta region (M), or cyan region (C). The dichroic dye used in the liquid crystal element of the present invention may be used either alone or in combination of a plurality of the dyes. When plural dyes are mixed, the dyes of the present invention may be mixed, or a dyes of the present invention and other known dichroic dye may be mixed, and it is preferred to use a mixture of the dichroic dyes having absorption maximums in Y, M, and C regions, respectively. Known dichroic dyes include those described in "Dichroic Dyes for Liquid Crystal Display" by A. V. Ivashchenko (CRC, 1994). Methods of displaying a full color by mixing a yellow dye, a magenta dye and a cyan dye is specifically described in "Color Chemistry" (by Sumio Tokita, Maruzen Company, Limited, 1982). The yellow region is the range of 430 to 490 nm, the magenta region is the range of 500 to 580 nm, and the cyan region is the range of 600 to 700 nm.

The chromophore used in the dichroic dye of the present invention is explained hereinafter.

In the present invention, the chromophore used in the dichroic dye is not particularly limited, but from the viewpoint of enhancing the display performance, it is preferred to use azo dye, anthraquinone dye, perylene dye, melocyanine dye, azomethine dye, phthaloperylene dye, indigo dye, azulene dye, dioxazine dye, polythiophene dye, and phenoxazone dye (phenoxazine-3-on), and specific examples are listed in "Dichroic Dyes for Liquid Crystal Display" by A. V. Ivashchenko (CRC, 1994).

Preferred examples include an azo dye, an anthraquinone dye, a perylene dye, and a phenoxazone dye, and further preferred examples are an anthraquinone and/or phenoxazone dyes. In particular, when these dyes having the substituent represented by Formula (2) below, the effects of the present invention are remarkably exerted.

More specifically, the dichroic dye of the present invention has preferably the substituent represented by Formula (2).

Formula (2)

$$—(Het)_j\left[(B^1)_p—(Q^1)_q—(B^2)_r\right]_n C^1$$

wherein Het is an oxygen atom or a sulfur atom, and preferably a sulfur atom.

In Formula (2), $B^1$ and $B^2$ each represent an arylene group, a heteroarylene group, or a divalent cyclic aliphatic hydrocarbon group, which may have a substituent.

The arylene group represented by $B^1$ and $B^2$ is preferably an arylene group having 6 to 20 carbon atoms, or more preferably 6 to 10 carbon atoms. Preferred examples of the arylene group include a phenylene group, a naphthalene group, and an anthracene group. Substituted phenylene group is particularly preferred, and 1,4-phenyl group is further preferred.

The heteroarylene group represented by $B^1$ and $B^2$ is preferably a heteroarylene group having 1 to 20 carbon atoms, more preferably 1 to 10 carbon atoms, and most preferably 2 to 9 carbon atoms. Specific examples of the heteroarylene group include groups having a pyridine ring, a quinoline ring, an isoquinoline ring, a pyrimidine ring, a pyrazine ring, a thiophene ring, a furan ring, an oxazole ring, a thiazole ring, an imidazole ring, a pyrazole ring, an oxadiazole ring, a thiadiazole ring, a triazole ring, and a heteroarylene group which is obtained by subtracting one hydrogen atom from each of hydrogen atoms bonded to two carbon atoms of a condensed ring formed by condensing the above rings.

The divalent cyclic aliphatic hydrocarbon group represented by $B^1$ and $B^2$ is preferably a divalent cyclic aliphatic hydrocarbon group having 4 to 30 carbon atoms, more preferably 6 to 20 carbon atoms, further preferably 3 to 20 carbon atoms, and particularly preferably 4 to 10 carbon atoms. Specific examples of preferred divalent cyclic aliphatic hydrocarbon groups include a cyclohexadiyl and cyclopentadiyl, more preferably cyclohexane-1,2-diyl group, cyclohexane-1,3-diyl group, cyclohexane-1,4 diyl group, and cyclopentane-1,3-diyl, and most preferably (E)-cyclohexane-1,4-diyl.

The divalent arylene group, divalent heteroarylene group, and divalent cyclic hydrocarbon group represented by $B^1$ and $B^2$ may further have a substituent. The substituents include the substituent group V as described in the above.

Preferred examples of the substituent group V include an alkyl group, an aryl group, an alkoxy group, an aryl oxy group, a halogen atom, a amino group, a substituted amino group, a hydroxyl group, an alkylthio group, an arylthio group, and a sulfo group, and more preferably, are an alkyl group, an aryl group, a halogen atom, and a sulfo group.

$Q^1$ is a divalent linking group, and is preferably a linking group having an atomic group containing at least one atom selected from the group consisting of a carbon atom, nitrogen atom, sulfur atom, and oxygen atom.

The divalent linking group represented by $Q^1$ is preferably a divalent linking group having 0 to 60 carbon atoms, more preferably 0 to 30 carbon atoms, further preferably 2 to 20 carbon atoms, and particularly preferably 0 to 10 carbon atoms.

The divalent linking group represented by $Q^1$ is preferably an alkylene group, an alkenylene group, an alkenylene group, an amido group, an ether group, an ester group, a sulfoamide group, sulfonic acid ester group, ureido group, sulfonyl group, sulfinyl group, thioether group, carbonyl group, —NR— group (R represents a hydrogen atom, an alkyl group, or an aryl group), azo group, azoxy group, and divalent linking group combining one or more heterocyclic ring divalent groups.

The alkylene group represented by $Q^1$ is preferably an alkylene group having 1 to 20 carbon atoms, more preferably 1 to 10 carbon atoms, and includes, for example, a methylene group, an ethylene group, a propylene group, a butylene group, a pentylene group, and a cyclohexyl-1,4-diyl group.

The alkenylene group represented by $Q^1$ is preferably an alkenylene group having 2 to 20 carbon atoms, more preferably 2 to 10 carbon atoms, and includes, for example, an ethynylene group.

The alkynilene group represented by $Q^1$ is preferably alkynilene group having 2 to 20 carbon atoms, more preferably 2 to 10 carbon atoms, and includes, for example, an ethynylene group.

The alkyl group represented by R in —NR— is preferably an alkyl group having 1 to 20 carbon atoms, more preferably 1 to 10 carbon atoms, or most preferably 1 to 6 carbon atoms, and an aryl group represented by R in —NR— is preferably an aryl group having 6 to 20 carbon atoms, more preferably 6 to 14 carbon atoms, or most preferably 6 to 10 carbon atoms.

The heterocyclic ring represented by $Q^1$ is preferably a heterocyclic ring having 2 to 20 carbon atoms, or more preferably 4 to 10 carbon atoms, and includes, for example, a piperazine group, such as piperazine-1,4-diyl group.

The divalent linking group represented by $Q^1$ is preferably an alkylene group, an alkenylene group, an alkynylene group, an ether group, a thioether group, an amido group, an ester group, a carbonyl group, and a group combining these groups.

The divalent linking group represented by $Q^1$ further preferably includes an alkylene group, an alkynylene group, an ether group, an amido group, an ester group, and a carbonyl group, and an alkylene group and an ester group are particularly preferred.

$C^1$ represents an alkyl group, a cycloalkyl group, an alkoxy group, an alkoxy carbonyl group, a acyl group, or an acyloxy group.

$C^1$ is preferably an alkyl group or a cycloalkyl group having 1 to 30 carbon atoms, more preferably 1 to 12 carbon atoms, or most preferably 1 to 8 carbon atoms, an alkoxy group having 1 to 20 carbon atoms, more preferably 1 to 10 carbon atoms, or most preferably 1 to 8 carbon atoms, an acyloxy group having 1 to 20 carbon atoms, more preferably 2 to 12 carbon atoms, or most preferably 2 to 8 carbon atoms, an acyl group having 1 to 30 carbon atoms, more preferably 1 to 12 carbon atoms, or most preferably 1 to 8 carbon atoms, or an alkoxy carbonyl group having 2 to 20 carbon atoms, more preferably 2 to 12 carbon atoms, or most preferably 2 to 8 carbon atoms.

The alkyl group, cycloalkyl group, alkoxy group, alkoxy carbonyl group, acyl group, or acyloxy group may have a substituent, and the substituent may be selected from the substituent group V as described above.

Substituent group for the alkyl group represented by $C^1$ is preferably, in the first aspect of the present invention, a halogen atom (fluorine atom, chlorine atom, bromine atom, iodine atom), a hydroxyl group, an alkoxy group (in particular, methoxy group), and an aryl group (in particular, phenyl group), among the substituent group V.

Substituent for the alkyl group represented by $C^1$ is preferably, in the second aspect of the present invention, a halogen atom, a cyano group, a hydroxyl group, a carbamoyl group, an alkoxy group, an aryloxy group, an acyl group, an acyloxy group, an acyl amino group, an amino group, an alkylthio group, an arylthio group, a heteroaryl thio group, an alkoxy carbonyl group, and an aryloxy carbonyl group, among the substituent group V.

Substituent for the cycloalkyl group represented by $C^1$ is preferably, in the first aspect of the present invention, a halogen atom (fluorine atom, chlorine atom, bromine atom, iodine atom), a hydroxyl group, an alkoxy group (in particular, methoxy group), and aryl group (in particular, phenyl group), among the substituent group V.

Substituent for the cycloalkyl group represented by $C^1$ is preferably, in the second aspect of the present invention, a halogen atom, a cyano group, a hydroxyl group, a carbamoyl group, an alkoxy group, an aryloxy group, an acyl group, an acyloxy group, an acyl amino group, an amino group, an alkylthio group, an arylthio group, a heteroarylthio group, an alkoxy carbonyl group, an aryloxy carbonyl group, and an alkyl group, among the substituent group V.

Substituent for the alkoxy group represented by $C^1$ is preferably, in the first aspect of the present invention, a halogen atom (in particular, fluorine atom), an alkoxy group (in particular, methoxy group, ethoxy group), and an aryl group-(in particular, phenyl group), among the substituent group V.

Substituent for the alkoxy group represented by $C^1$ is preferably, in the second aspect of the present invention, a halogen atom (in particular, fluorine atom), a cyano group, a hydroxyl group, a carbamoyl group, an alkoxy group, an aryloxy group, an acyl group, an acyloxy group, an acyl amino group, an amino group, an alkylthio group, an arylthio group, a heteroarylthio group, an alkoxy carbonyl group, and an aryloxy carbonyl group, among the substituent group V.

Substituent for the alkoxy carbonyl group represented by $C^1$ is preferably, in the first aspect of the present invention, a halogen atom (in particular, fluorine atom), and an alkoxy group (in particular, methoxy group), among the substituent group V.

Substituent for the alkoxy carbonyl group represented by $C^1$ is preferably, in the second aspect of the present invention, a halogen atom, a cyano group, a hydroxyl group, a carbamoyl group, an alkoxy group, an aryloxy group, an acyl group, an acyloxy group, an acylamino group, an amino group, an alkylthio group, an arylthio group, a heteroarylthio group, an alkoxy carbonyl group, and an aryloxy carbonyl group, among the substituent group V.

Substituent for the acyl group represented by $C^1$ is preferably, in the first aspect of the present invention, a halogen atom (in particular, fluorine atom), and an alkoxy group (in particular, methoxy group), among the substituent group V.

Substituent for the acyl group represented by $C^1$ is preferably, in the second aspect of the present invention, a halogen atom, a cyano group, a hydroxyl group, a carbamoyl group, an alkoxy group, an aryloxy group, an acyl group, an acyloxy group, an acylamino group, an alkylthio group, an arylthio group, a heteroarylthio group, an alkoxy carbonyl group, and an aryloxy carbonyl group, among the substituent group V.

Substituent for the acyloxy group represented by $C^1$ is preferably, in the first aspect of the present invention, a halogen atom (in particular, fluorine atom), and an alkoxy group (in particular, methoxy group), among the substituent group V.

Substituent for the acyl oxy group represented by $C^1$ is preferably, in the second aspect of the present invention, a halogen atom, a cyano group, a hydroxyl group, a carbamoyl group, an alkoxy group, an aryloxy group, an acyl group, an acyloxy group, an acylamino group, an amino group, an alkylthio group, an arylthio group, a heteroarylthio group, an alkoxy carbonyl group, and an aryloxy carbonyl group, among the substituent group V.

Specific examples of the alkyl group and the cycloalkyl group represented by $C^1$ include a methyl group, ethyl group, propyl group, butyl group, tert-butyl group, i-butyl group, s-butyl group, pentyl group, tert-pentyl group, hexyl group, heptyl group, octyl group, cyclohexyl group, 4-methyl cyclohexyl group, 4-ethyl cyclohexyl group, 4-propyl cyclohexyl group, 4-butyl cyclohexyl group, 4-pentyl cyclohexyl group, hydroxy methyl group, trifluoromethyl group, and benzyl group.

Specific examples of the alkoxy group represented by $C^1$ include a methoxy group, ethoxy group, 2-methoxy ethoxy group, 2-phenyl ethoxy group, and trifluoromethoxy group.

Specific examples of the acyloxy group represented by $C^1$ include an acetyloxy group and benzoyl oxy group.

Specific examples of the acyl group represented by $C^1$ include an acetyl group, formyl group, pivaroyl group, 2-chloroacetyl group, stearoyl group, benzoyl group, and p-n-octyl oxy phenyl carbonyl group.

Specific examples of the alkoxy carbonyl group represented by $C^1$ include a methoxy carbonyl group, ethoxy carbonyl group, and 2-benzyl oxy carbonyl group.

$C^1$ is preferably an alkyl group or an alkoxy group, and more preferably an ethyl group, propyl group, butyl group, pentyl group, hexyl group, or trifluoromethoxy group.

j is 0 or 1, preferably 0.

p, q and r each independently represent an integer of 0 to 5, and n is an integer of 1 to 3. Total number of groups represented by $B^1$ and $B^2$, that is, (p+r)×n is an integer of 3 to 10, and more preferably an integer of 3 to 6. When p, q and r each represent 2 or more, two or more of $B^1$, $Q^1$ and $B^2$ may be either the same or different, and when n is 2 or more, two or more of $\{(B^1)_p\text{-}(Q^1)_q\text{-}(B^2)_r\}$ may be either the same or different.

Preferred combinations of p, q, r and n are as follows.

(i) p=3, q=0, r=0, n=1
(ii) p=4, q=0, r=0, n=1
(iii) p=5, q=0, r=0, n=1
(iv) p=2, q=0, r=1, n=1
(v) p=2, q=1, r=1, n=1
(vi) p=1, q=1, r=2, n=1
(vii) p=3, q=1, r=1, n=1
(viii) p=2, q=0, r=2, n=1
(ix) p=1, q=1, r=1, n=2
(x) p=2, q=1, r=1, n=2

Particularly preferred combinations are (i) p=3, q=0, r=0, n=1; (iv) p=2, q=0, r=1, n=1; and (v) p=2, q=1, r=1, n=1.

Further, $\text{—}\{(B^1)_p\text{-}(Q^1)_q\text{-}(B^2)_r\}_n\text{—}C^1$ preferably contains a partial structure having a liquid crystallinity. The phase of the liquid crystal is not specifically limited, but preferably includes a nematic liquid crystal, a smectic liquid crystal, and a discotic liquid crystal, and the nematic liquid crystal is particularly preferable.

Specific example of $\text{—}\{(B^1)_p\text{-}(Q^1)_q\text{-}(B^2)_r\}_n\text{—}C^1$ will be described below, but the present invention is not limited to these examples (in this formula, the wavy lines indicate the linking positions).

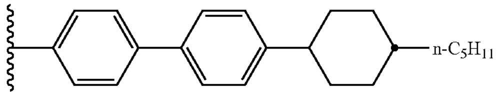

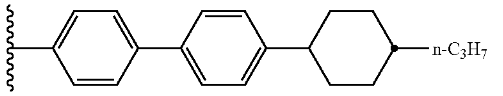

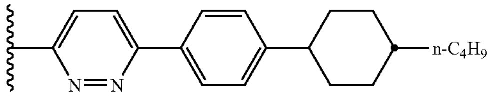

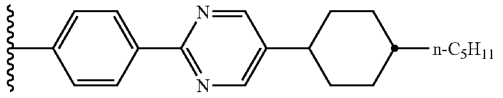

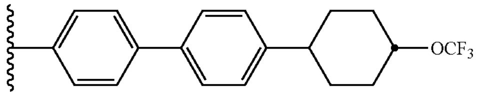

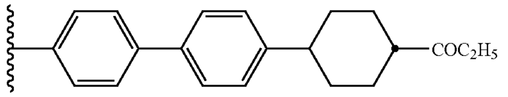

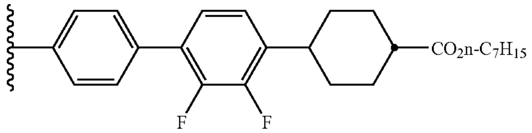

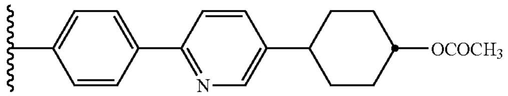

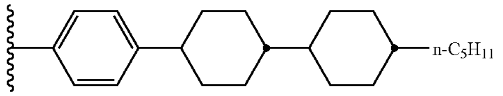

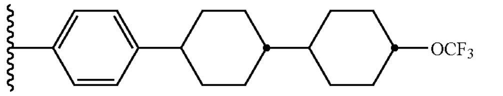

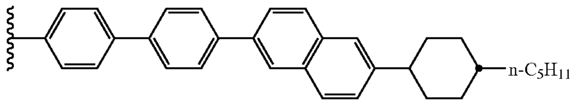

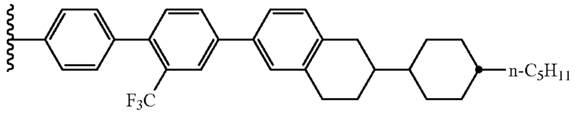

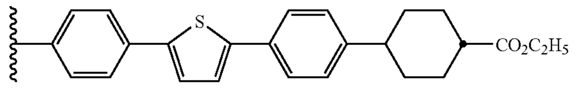

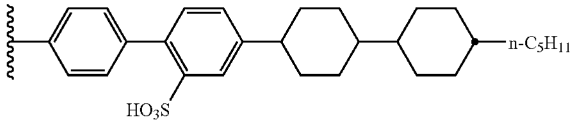

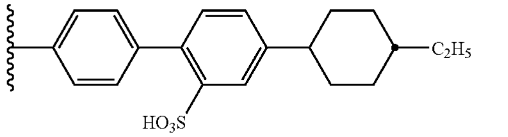

The dichroic dye of the present invention has preferably at least one or more substituents represented by $\text{—}\{(B^1)_p\text{-}(Q^1)_q\text{-}(B^2)_r\}_n\text{—}C^1$, preferably 1 to 8 substituents, more preferably 1 to 4, or most preferably 1 or 2.

A preferred structure of substituents represented by Formula (2) is the following combination.

[1] A structure in which Het is a sulfur atom, $B^1$ represents an aryl group or a heteroaryl group, $B^2$ represents a cyclohexane-1,4-diyl group, $C^1$ represents an alkyl group, and j=1, p=2, q=0, r=1, and n=1.

[2] A structure in which Het is a sulfur atom, $B^1$ represents an aryl group or a heteroaryl group, $B^2$ represents a cyclohexane-1,4-diyl group, $C^1$ represents an alkyl group, and j=1, p=1, q=0, r=2, and n=1.

Particularly preferred structures are as follows:

[I] A structure in which Het represents a sulfur atom, $B^1$ represents a 1,4-phenylene group, $B^2$ represents a trans-cyclohexyl group, $C^1$ represents an alkyl group (preferably methyl group, ethyl group, propyl group, butyl group, pentyl group or hexyl group), and j=1, p=2, q=0, r=1, and n=1, as represented by Formula (a-1) below.

[II] A structure in which Het represents a sulfur atom, $B^1$ represents a 1,4-phenylene group, $B^2$ represents a trans-cyclohexane-1,4-diyl group, $C^1$ represents an alkyl group (preferably methyl group, ethyl group, propyl group, butyl group, pentyl group or hexyl group), and j=1, p=1, q=0, r=2, and n=1, as represented by formula (a-2) below;

Formula (a-1)

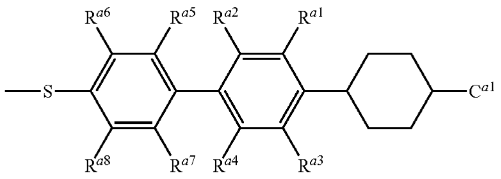

Formula (a-2)

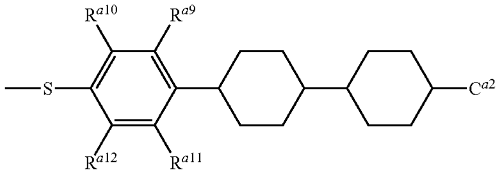

In Formulas (a-1) and (a-2), $R^{a1}$ to $R^{a12}$ each independently represent a hydrogen atom or a substituent. The substituent includes substituents selected from the substituent group V as described above.

$R^{a1}$ to $R^{a12}$ each independently represent a hydrogen atom, a halogen atom (in particular, fluorine atom), an alkyl group, an aryl group, and an alkoxy group. Of the alkyl group, aryl group, and alkoxy group represented by $R^{a1}$ to $R^{a12}$, preferred alkyl group, aryl group, and alkoxy group are the same described in the substituent group V in the above.

In formulas (a-1) and (a-2), $C^{a1}$ and $C^{a2}$ each independently represent an alkyl group, preferably an alkyl group having 1 to 20 carbon atoms, more preferably 1 to 10 carbon atoms. Particularly preferred examples are a methyl group, ethyl group, propyl group, butyl group, pentyl group, and hexyl group.

Azo dye includes monoazo dye, bisazo dye, trisazo dye, tetraxisazo dye, pentaxisazo dye, and others, and monoazo dye, bisazo dye, and trisazo dye are preferred.

Cyclic structures contained in the azo dye include aromatic rings (benzene ring, naphthalene ring and the like), and other hetero rings (quinoline ring, pyridine ring, thiazole ring, benzothiazole ring, oxazole ring, benzoxazole ring, imidazole ring, benzimidazole ring, pyrimidine ring and the like).

Substituent for the anthraquinone dye preferably contains an oxygen atom, a sulfur atom or a nitrogen atom, such as an alkoxy group, an aryloxy group, an alkylthio group, an arylthio group, an alkyl amino group, and an aryl amino group.

The number of substituents is not specifically limited, but is preferably di-substitution, tri-substitution or tetraxis-substitution, and di-substitution and tri-substitution are particularly preferred. The position of the substituent is not particularly limited, but preferred examples are di-substitution at 1,4 positions, di-substitution at 1,5 positions, tri-substitution at 1,4,5 positions, tri-substitution at 1,2,4-positions, tri-substitution at 1,2,5-position, tetra-substitution at 1,2,4,5 positions, and tetra-substitution at 1,2,5,6 position.

The anthraquinone dye is a compound represented by Formula (3) below.

Formula (3)

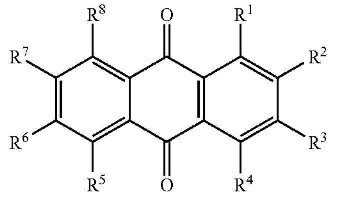

In Formula (3), at least one of $R^1$, $R^2$, $R^3$, $R^4$, $R^5$, $R^6$, $R^7$ and $R^8$ is $-(Het)_j-\{(B^1)_p-(Q^1)_q-(B^2)_r\}_n-C^1$, and others are independently a hydrogen atom or a substituent. In $-(Het)_j-\{(B^1)_p-(Q^1)_q-(B^2)_r\}_n-C^1$, Het is an oxygen atom or a sulfur atom, $B^1$ and $B^2$ each independently represent an arylene group, a heteroarylene group, or a divalent cyclic aliphatic hydrocarbon group, $Q^1$ represents a divalent linking group, $C^1$ represents an alkyl group, a cycloalkyl group, an alkoxy group, an alkoxy carbonyl group, an acyl group, or an acyloxy group, j is 0 or 1, p, q and r each independently represent an integer of 0 to 5, and n is an integer of 1 to 3. (p+r)×n is an integer of 3 to 10, preferably an integer of 3 to 6, and more preferably an integer of 3 to 5. When p, q and r are 2 or more, two or more of $B^1$, $Q^1$, and $B^2$ may be either the same or different, and when n is 2 or more, two or more of $\{(B^1)_p-(Q^1)_q-(B^2)_r\}$ may be either the same or different.

Herein, a preferred range of Het, $B^1$, $B^2$, $Q^1$, $C^1$, j, p, q, r, and n is same as the preferred range of Het, $B^1$, $B^2$, $Q^1$, $C^1$, j, p, q, r and n specified in Formula (2) above.

The substituent in Formula (3) is preferably, in the first aspect of the present invention, a halogen atom (fluorine atom, chlorine atom, bromine atom, iodine atom), an alkyl group (in particular, methyl group, ethyl group, propyl group, butyl group), an aryl group (in particular, phenyl group), an alkoxy group (in particular, methoxy group), and an aryloxy group (in particular, phenoxy group), and more preferably a halogen atom (in particular, fluorine atom) and an alkyl group (in particular, methyl group, ethyl group, propyl group, butyl group), among the substituent group V.

The substituent in Formula (3) is preferably, in the second aspect of the present invention, a halogen atom, a mercapto group, a hydroxyl group, a carbamoyl group, a sulfamoyl group, a nitro group, an alkoxy group, an aryloxy group, an acyloxy group, an acylamino group, an amino group, an alkylthio group, an arylthio group, a heteroarylthio group, an alkoxy carbonyl group, an aryloxy carbonyl group, an alkyl group, an aryl group, and a heteroaryl group, and more preferably a halogen atom, a hydroxyl group, a nitro group, an alkoxy group, an aryloxy group, an acyloxy group, an amino group, an alkylthio group, an arylthio group, a heteroarylthio group, an alkoxy carbonyl group, an aryloxy carbonyl group, an alkyl group, an aryl group, and a heteroaryl group, among substituent group V.

In Formula (3), at least one of $R^1$, $R^4$, $R^5$, and $R^8$ is $-(Het)_j-\{(B^1)_p-(Q^1)_q-(B^2)_r\}_n—C^1$.

The substituent for a phenoxazone dye (phenoxazine-3-on) preferably contains an oxygen atom, a sulfur atom or a nitrogen atom, and preferred examples include an alkoxy group, an aryloxy group, an alkylthio group, an arylthio group, an alkylamino group, and an arylamino group.

More preferably, the phenoxazone dye is a compound represented by Formula (4) below;

Formula (4)

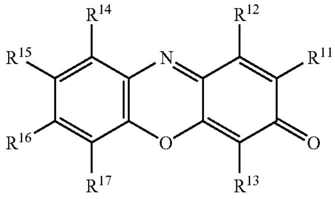

In Formula (4), at least one of $R^{11}$, $R^{12}$, $R^{13}$, $R^{14}$, $R^{15}$, $R^{16}$, and $R^{17}$ is $-(Het)_j-\{(B^1)_p-(Q^1)_q-(B^2)_r\}_n—C^1$, and others each represent a hydrogen atom or a substituent.

In $-(Het)_j-\{(B^1)_p-(Q^1)_q-(B^2)_r\}_n—C^1$, Het represents an oxygen atom or a sulfur atom, $B^1$ and $B^2$ each represent an arylene group, a heteroarylene group, or a divalent cyclic aliphatic hydrocarbon group, $Q^1$ is a divalent linking group, $C^1$ is an alkyl group, a cycloalkyl group, an alkoxy group, an alkoxy carbonyl group, an acyl group, or an acyloxy group, j is 0 or 1, p, q and r each independently represent an integer of 0 to 5, and n is an integer of 1 to 3. (p+r)xn is an integer of 3 to 10, preferably an integer of 3 to 6, and more preferably an integer of 3 to 5. When p, q and r are 2 or more, two or more of $B^1$, $Q^1$ and $B^2$ may be either the same or different, and when n is 2 or more, two or more of $\{(B^1)_p-(Q^1)_q-(B^2)_r\}$ may be either the same or different.

Herein, a preferred range of Het, $B^1$, $B^2$, $Q^1$, $C^1$, j, p, q, r, and n is the same as the preferred range of Het, $B^1$, $B^2$, $Q^1$, $C^1$, j, p, q, r, and n specified in Formula (2).

The substituent in Formula (4) is preferably, in the first aspect of the present invention, an aryl carbamoyl group, an amino group, a halogen atom (in particular, fluorine atom), an alkyl group (in particular, methyl group, ethyl group), an alkoxy group (in particular, methoxy group), an aryloxy group (in particular, phenoxy group), an aryl group (in particular, phenyl group), and more preferably an aryl carbamoyl group, and an amino group, among the substituent group V.

The substituent in Formula (4) is preferably, in the second aspect of the present invention, an amino group, a halogen atom, a hydroxyl group, a cyano group, a carbamoyl group, a sulfamoyl group, an alkoxy group, an aryloxy group, an acyloxy group, an acylamino group, a ureido group, an imido group, an alkylthio group, an arylthio group, a heteroarylthio group, analkoxy carbonyl group, an aryloxy carbonyl group, an alkyl group, an aryl group, and a heteroaryl group, and more preferably an amino group, a halogen atom, a hydroxyl group, a carbamoyl group, a acyloxy group, an acylamino group, an imido group, an alkylthio group, anarylthio group, a heteroarylthio group, an alkoxy carbonyl group, an aryloxy carbonyl group, an alkyl group, and an aryl group, among the substituent group V.

More preferably, in a formula (4), at least one of $R^{11}$, $R^{16}$ and $R^{14}$ is $-(Het)_j-\{(B^1)_p-(Q^1)_q-(B^2)_r\}_n—C^1$.

Specific examples of the dichroic dye of the anthraquinone dye and/or phenoxazone dye usable in the present invention is described below, but the present invention is not limited to these examples.

No. 1-1

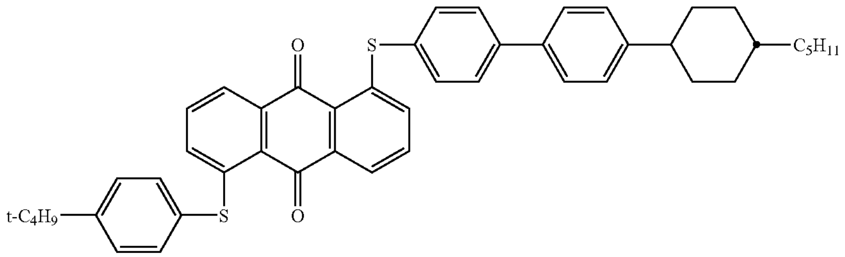

No. 1-2

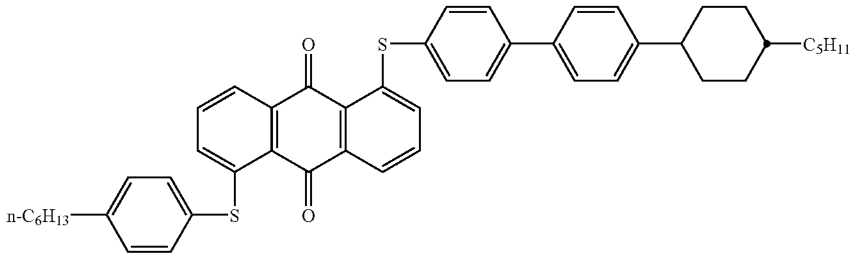

-continued
No. 1-3
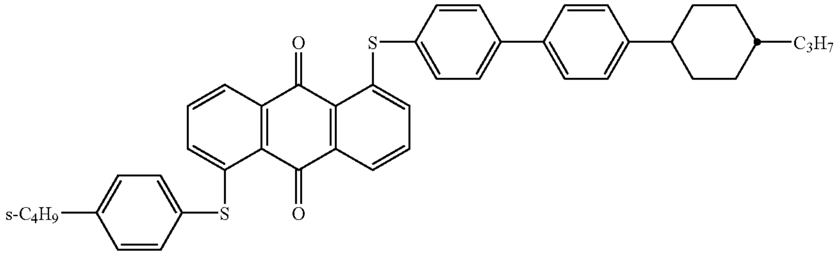
No. 1-4
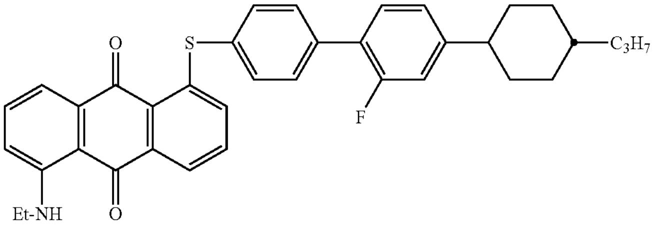
No. 1-5
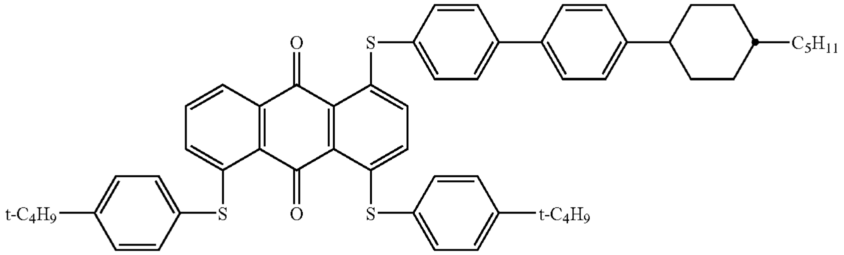
No. 1-6
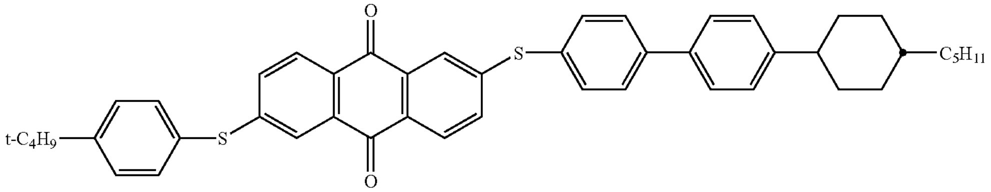
No. 1-7
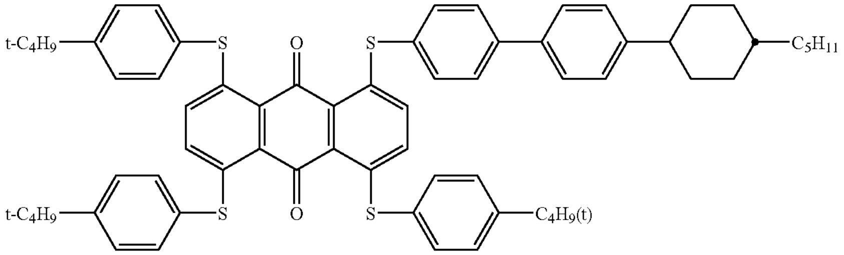
No. 1-8
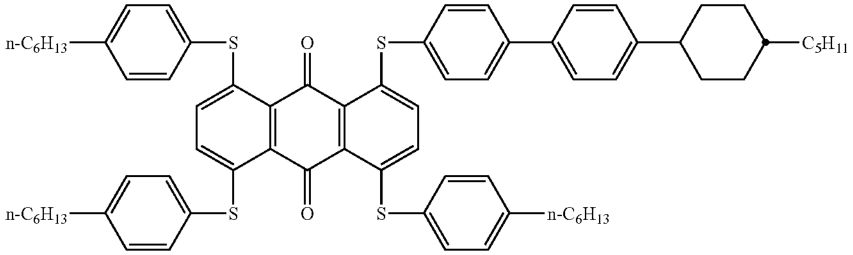

-continued
No. 1-9
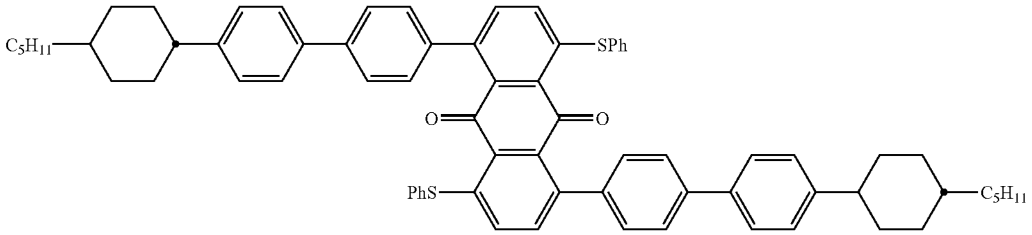
No. 1-10
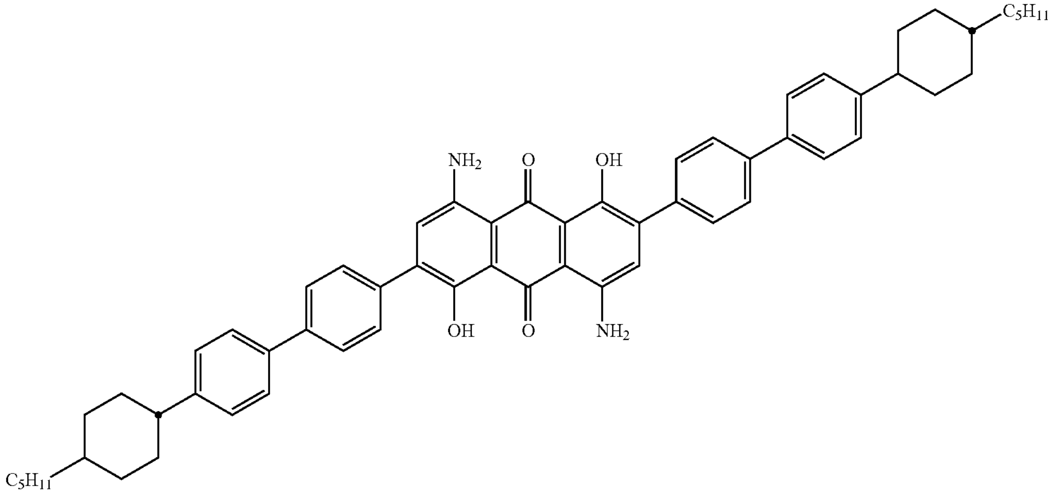
No. 1-11
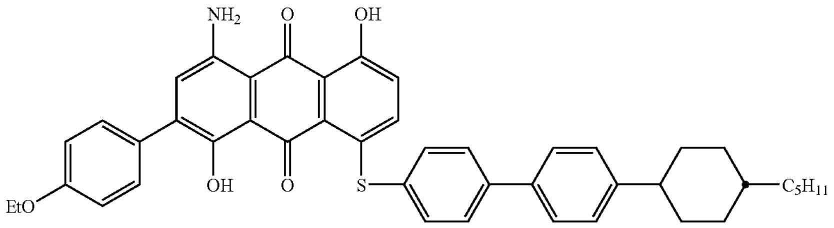
No. 1-12
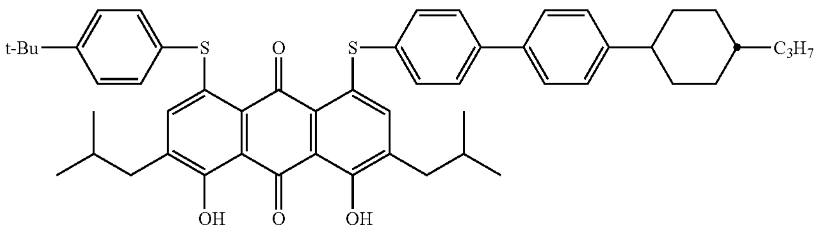
No. 1-13
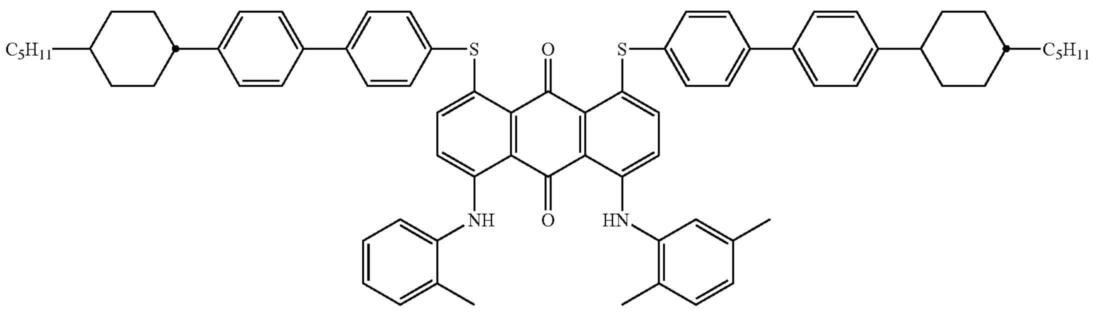

-continued
No. 1-14
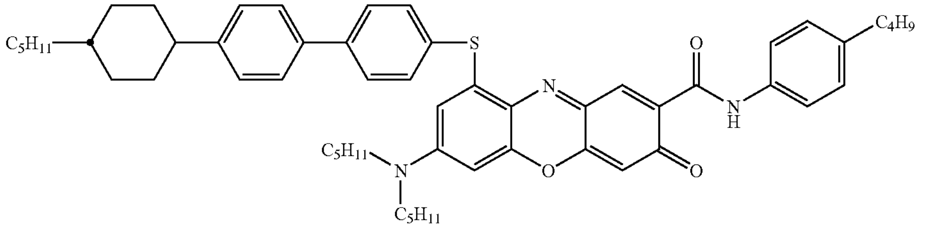
No. 1-15
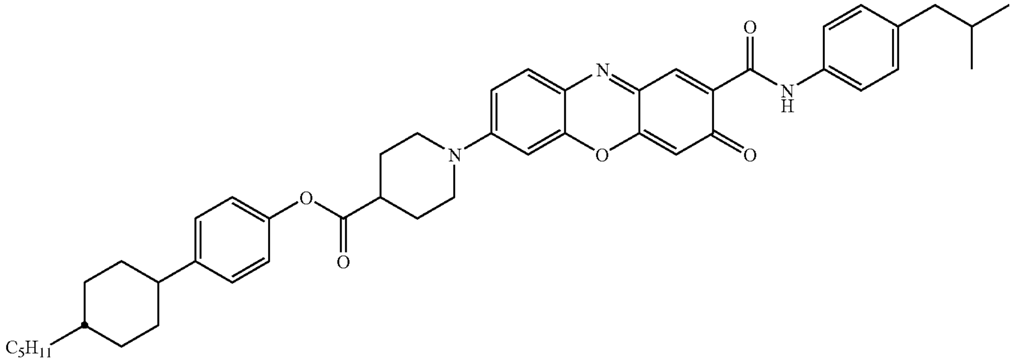
No. 1-16
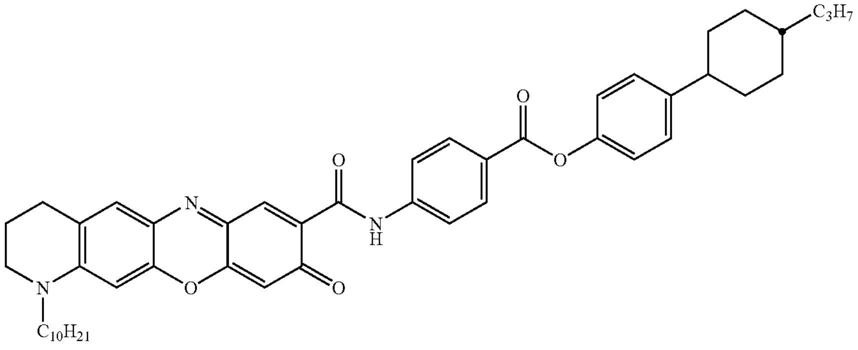
No. 1-17
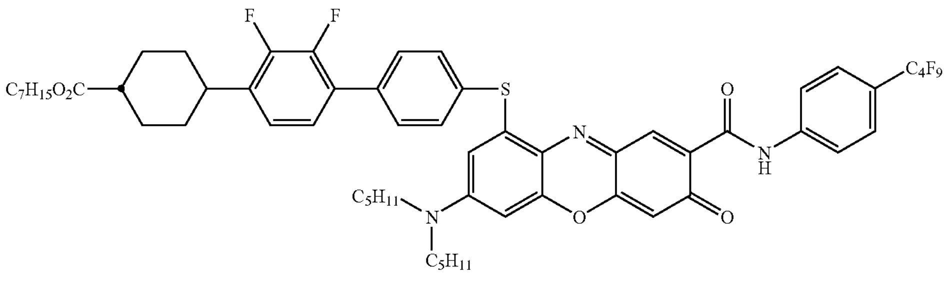
Specific examples of the azo-type dichroic dye usable in the present invention are shown below, but the present invention is not limited to these examples.
No. 2-1
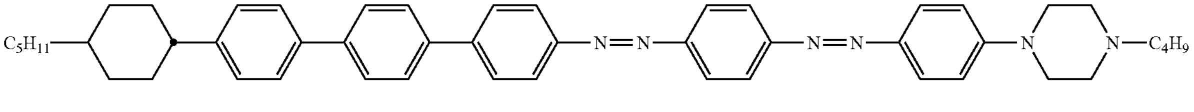

-continued

No. 2-2

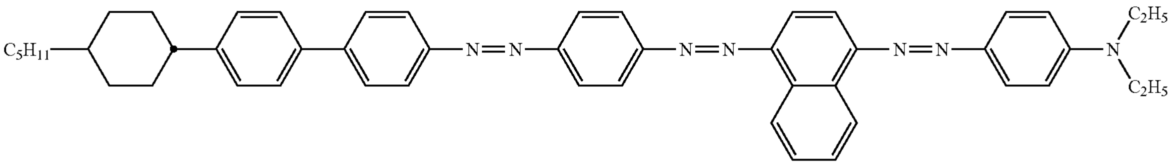

No. 2-3

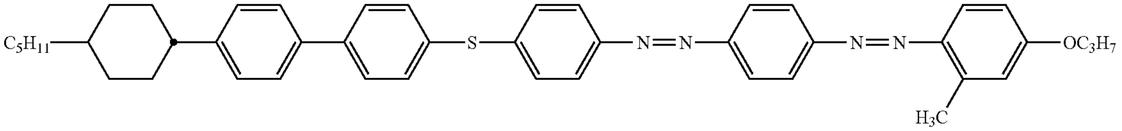

Specific examples of the dioxazine dichroic dye and merocyanine dichroic dye usable in the present invention are shown below, but the present invention is not limited to these specific examples.

No. 3-1

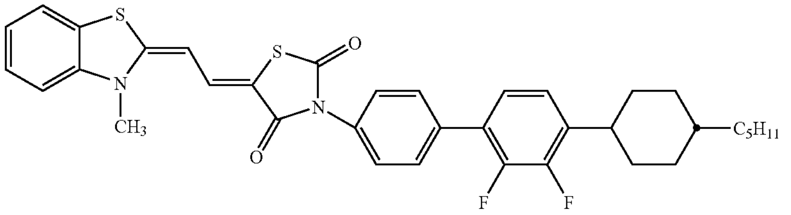

No. 3-2

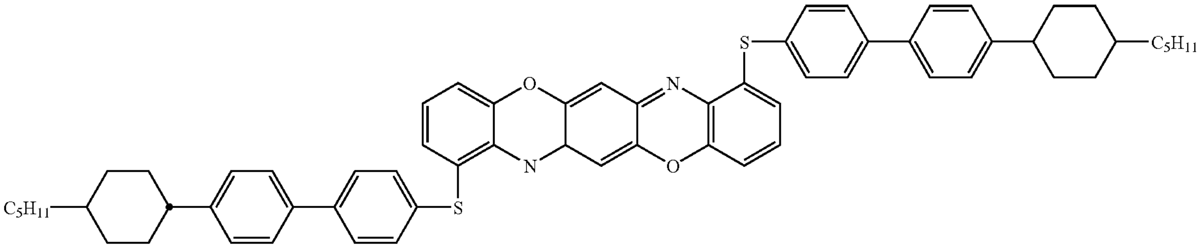

The dichroic dye having a substituent represented by Formula (2) can be synthesized by combining known methods. For example, the method disclosed in JP-A No. 2003-192664 may be employed.

The content of the fluorinated liquid crystal and the dichroic dye in the liquid crystal element in the first aspect of the present invention is not particularly limited, but preferably the content of the dichroic dye is 0.1 to 15% by mass with respect to the content of the fluorinated liquid crystal, or more preferably 0.5 to 6% by mass. The content of the fluorinated liquid crystal and the siloxane polymer in the liquid crystal element in the first aspect of the present invention is not particularly limited, but preferably the content of the siloxane polymer is 10 to 95% by mass with respect to the content of the siloxane polymer, more preferably 30 to 70% by mass, or most preferably 40 to 60% by mass.

The content of dichroic dye is preferably determined in such a manner that a liquid crystal composition is prepared, the absorption spectrum of a liquid crystal cell in which the liquid crystal composition is enclosed is measured, and the dye concentration necessary for showing a desired optical density as the liquid crystal cell is determined.

The ratio of the dichroic dye to the host liquid crystal in the liquid crystal composition in the second aspect of the present invention is not particularly limited, but is preferably 0.1 to 15% by mass, or more preferably 0.5 to 6% by mass.

The dichroic dye is dissolved in the host liquid crystal (a mixture of a fluorinated liquid crystal and a siloxane polymer in the first aspect of the present invention, and a mixture of a liquid crystalline siloxane polymer and a low molecular-weight liquid crystal in the second aspect of the present invention) by means of mechanical agitation, heating, ultrasonic wave, or combination thereof.

Known methods can be employed for other preparation of the liquid crystal composition of the present invention.

In the first aspect of the present invention, in order to control the physical properties of the liquid crystal composition in a desired range (for example, to adjust the temperature range of the liquid crystal phase in a desired range), a compound which does not have the liquid crystallinity may be added. Further, other compounds such as a chiral compound, an ultraviolet absorber, or an antioxidant may be also added. Such additives include chiral agents for TN and STN described from pages 199 to 202 of Liquid Crystal Device Handbook, edited by Committee 142 of Japan Society for the Promotion of Science, Nikkan Kogyo Shimbunsha, 1989.

One of preferred embodiments of the present invention is a mode utilizing a chiral nematic liquid crystal phase in which a chiral compound is added to the chiral nematic liquid crystal phase. The chiral compound includes R-811, S-811, R-1082, and R-1082 manufactured by Merck & Co., Inc. The ratio of the chiral compound is preferably 0.01 to 15% by mass, or more preferably 0.5 to 6% by mass.

The liquid crystal element of the present invention includes a pair of electrodes, at least one of which is a transparent electrode, and a liquid crystal layer disposed between the pair of electrodes, in which the liquid crystal layer contains the liquid crystal composition as described in the above.

The substrate used in the liquid crystal element of the present invention is usually glass or plastic substrate, and a plastic substrate is preferred. The plastic substrate used in the present invention is an acrylic resin, a polycarbonate resin, or an epoxy resin, for example, triacetyl cellulose (TAC), polyethylene terephthalate (PET), polyethylene naphthalate (PEN), syndiotactic polystyrene (SPS), polyphenylene sulfide (PPS), polycarbonate (PC), polyarylate (PAr), polysulfone (PSF), polyester sulfone (PES), polyether imide (PEI), cyclic polyolefin, and polyimide (PI). In particular, polyethylene terephthalate (PET) is preferred.

Thickness of the plastic substrate is not particularly limited, but is preferably 30 μm to 700 μm, more preferably 40 μm to 200 μm, and most preferably 50 μm to 150 μm. In any case, the haze is preferably 3% or less, more preferably 2% or less, and most preferably 1% or less, and the total light transmittance is preferably 70% or more, more preferably 80% or more, and most preferably 90% or more.

In the plastic substrate, a resin property-reforming agent may be added, as occasion demands, unless the effects of the present invention is impaired, such as a plasticizer, dye/pigment, antistatic agent, ultraviolet absorber, antioxidant, inorganic fine particles, release promoting agent, leveling agent, or lubricant.

The plastic substrate may be either light-transmissive or light non-transmissive. In the case of a light non-transmissive substrate, a white substrate having a light reflectivity may be used. A white substrate is, for example, a plastic substrate containing an inorganic pigment such as titanium oxide or zinc oxide. When the substrate includes a display surface, the substrate is necessary to have a light transmittance of at least light in the visible range.

The substrate is specifically described, for example, from pages 218 to 231 of Liquid Crystal Device Handbook, edited by Committee 142 of Japan Society for the Promotion of Science, Nikkan Kogyo Shimbunsha, 1989.

On the substrate, an electrode layer is formed, and the electrode layer is preferably a transparent electrode. The transparent electrode layer may be formed of, for example, indium oxide, indium tin oxide (ITO), or tin oxide. The transparent electrode is described, for example, from pages 232 to 239 of Liquid Crystal Device Handbook, edited by Committee 142 of Japan Society for the Promotion of Science, Nikkan Kogyo Shimbunsha, 1989. The transparent electrode can be formed by a sputtering method, a sol-gel method, or a printing method.

In order to orient the liquid crystal in the liquid crystal element of the present invention, it is preferred to form a layer which is subjected to an orientation treatment on the surface at which the liquid crystal comes into contact with the substrate. The orientation treatment includes a method in which a quaternary ammonium salt is coated and oriented, a polyimide is coated and subjected to a rubbing treatment, SiOx, is vapor-deposited in an oblique direction to be oriented, and a light irradiation method by utilizing a photo-isomerization for orientation. Orientation film is described, for example, from pages 240 to 256 of Liquid Crystal Device Handbook, edited by Committee 142 of Japan Society for the Promotion of Science, Nikkan Kogyo Shimbunsha, 1989.

The liquid crystal element of the present invention can be manufactured by disposing substrates ao as to face each other with an interval of 1 to 50 μm by the use of spacers or the like, and injecting the liquid crystal composition of the present invention into the interval. The spacer is described, for example, from pages 387 to 460 of Liquid Crystal Device Handbook, edited by Committee 142 of Japan Society for the Promotion of Science, Nikkan Kogyo Shimbunsha, 1989. The liquid crystal composition of the present invention can be disposed in the interval between the substrates by applying or printing the liquid crystal composition on the substrate.

In addition to the above, any known method may be applied for forming the liquid crystal element of the present invention.

The liquid crystal element of the present invention can be driven by a simple matrix driving system or an active matrix driving system using a thin film transistor (TFT) or the like. The driving system is described, for example, from pages 257 to 262 of Liquid Crystal Device Handbook, edited by Committee 142 of Japan Society for the Promotion of Science, Nikkan Kogyo Shimbunsha, 1989, which can be utilized as the driving system of the liquid crystal element of the present invention.

A preferred range of the frequency region of voltage to be applied to the liquid crystal layer in the liquid crystal element in the first aspect of the present invention varies with the type of the liquid crystal composition to be used, a cross-over frequency of the liquid crystal composition or the like, and generally the frequency region of an electric field to be applied to the liquid crystal composition is preferably 0.1 Hz to 10 MHz, or more preferably 1 Hz to 1 MHz.

In the case of the two-frequency driving liquid crystal, voltages in a low frequency region and a high frequency region are used. The low frequency region is preferably 0.1 Hz to 100 kHz, more preferably 1 Hz to 10 kHz, or most preferably 10 Hz to 10 kHz. The high frequency region is preferably 100 Hz to 10 MHz, more preferably 100 Hz to 1 MHz, or most preferably 1 kHz to 1 MHz.

The voltages in a low frequency region and a high frequency region are used for driving the liquid crystal element in the second aspect of the present invention. A preferred range of the frequency region of the voltage applied to the liquid crystal layer varies with the type of the liquid crystal composition to be used, the cross-over frequency of the liquid crystal composition or the like, and generally, the frequency region of the electric field applied to the liquid crystal composition is preferably 0.1 Hz to 10 MHz, or more preferably 1 Hz to 1 MHz. The low frequency region is preferably 0.1 Hz to 100 kHz, more preferably 1 Hz to 10 kHz, or most preferably 10 Hz to 10 kHz. The high frequency region is preferably 100 Hz to 10 MHz, more preferably 100 Hz to 1 MHz, or most preferably 1 kHz to 1 MHz.

The liquid crystal display using the liquid crystal element of the present invention may employ any system. The liquid crystal element of the present invention may be used in a laminate-type GH mode disclosed in JP-A Nos. 10-67990, 10-239702, 10-133223, 10-339881, 11-52411, and 11-64880, 2000-221538, or a GH mode using micro capsules disclosed in JP-A No. 11-24090.

In the liquid crystal element of the present invention, plural dichroic dyes may be mixed in one liquid crystal composition. The colors of the liquid crystal compositions are not specifically limited. For example, a black liquid crystal composition prepared by mixing plural dichroic dyes, may be used for a liquid crystal display element for a monochromatic display by applying voltage. Further, three liquid crystal compositions prepared by liquid crystal compositions having red, green and blue colors, respectively, are arrayed on a substrate, and a liquid crystal element for color display is produced. The liquid crystal element of the present invention may have a laminated structure. Examples include a three-layer laminated structure formed of liquid crystal compositions having yellow, magenta and cyan colors, respectively; a two-layer laminated structure formed of a layer in which liquid crystal compositions having yellow, magenta and cyan colors, respectively, are arrayed, and a layer in which liquid crystal compositions having blue, green and red colors, respectively, which are complementary colors of blue, green and red, respectively, are arrayed; and a two-layer laminated structure formed of a layer containing a black colored liquid crystal composition, and a layer in which red, blue and green liquid crystal compositions, respectively, are arrayed.

EXAMPLES

The present invention is further described specifically with reference to examples. The materials, contents, rates, processing contents, processing procedures and others shown in the examples may be properly modified or changed unless the modifications or changes depart from the true spirit and scope of the present invention. Therefore, the scope of the present invention is not limited to these examples.

Example 1

Evaluation of Liquid Crystal Composition of the Present Invention

Dichroic dyes (1-2), (1-8) and (1-14) were synthesized according to a method disclosed in JP-A No. 2003-192664. Siloxane polymers were synthesized by the method described in the publication (Polymer, Vol. 33, page 1822, 1992).

A mixture of 50 g of dichroic dye (1-2), 0.5 g of siloxane polymer (No. 1), and 1.0 g of fluorine substituted nematic liquid crystal (trade name: ZLI-5081, manufactured by Merck & Co., Inc.) was heated for 1 hour on hot plate at 120° C. The liquid crystal composition was cooled to room temperature, and allowed to stand overnight, and a liquid crystal composition A was prepared.

Similarly, liquid crystal composition B was prepared in the same manner as the liquid crystal composition A, except that dichroic dye (1-8) was added instead of the dichroic dye (1-2).

For comparison, liquid crystal composition C was prepared in the same manner as the liquid crystal composition A, except that cyano nematic liquid crystal (trade name: ZLI-1132, manufactured by Merck & Co., Inc.) was used.

Further, liquid crystal compositions D to G were prepared in the same manner as the liquid crystal composition A, except that the combinations of the dichroic dye and the siloxane polymer were changed as shown in Table 1.

<Preparation of Liquid Crystal Element>

Each of the liquid crystal compositions obtained above was heated again to 150° C., and disposed in a commercially available substrate for liquid crystal cell at this temperature, to prepare each of the liquid crystal elements. The substrate for liquid crystal cell was manufactured by E.H.C., which has a glass substrate on which an ITO transparent electrode layer was formed (thickness 0.7 mm), provided with an epoxy resin seal, with a cell gap of 8 μm. Further, a polyimide horizontally oriented film was disposed on the ITO transparent electrode.

<Evaluation of Responsive Speed>

Alternating-current voltage of 100 Hz and 40 V was applied to the resultant liquid crystal elements and responsive speed at this time was evaluated. The responsive speed was defined as the time until the change in the transmittance became 90%.

The results are shown in the table below.

TABLE 1

| Liquid crystal element | Dichroic dye | Liquid crystal | Siloxane polymer | Responsive e speed | Remarks |
|---|---|---|---|---|---|
| A | 1-2 | Fluorine-based (ZLI-5081) | No. 1 | 0.1 s | Invention |
| B | 1-8 | Fluorine-based (ZLI-5081) | No. 1 | 0.1 s | Invention |
| C | 1-2 | Cyano-based (ZLI-1132) | No. 1 | 0.8 s | Comparison |
| D | 1-14 | Fluorine-based (ZLI-5081) | No. 1 | 0.1 s | Invention |
| E | 1-2 | Fluorine-based (ZLI-4692 | No. 1 | 0.1 s | Invention |
| F | 1-2 | Fluorine-based (ZLI-5081) | No. 3 | 0.1 s | Invention |
| G | 1-2 | Fluorine-based (fluorinated liquid crystal 1) | No. 1 | 0.1 s | Invention |

It was found that the liquid crystal elements of the present invention had quick responsive speeds. This is considered because the viscosity is low by the use of a combination of the fluorine system nematic liquid crystal and siloxane polymer. Since the liquid crystal composition of the present invention is a mixture of a liquid crystal with a polymer, it is confirmed that the liquid crystal element can easily produced by coating.

Example 2

Synthesis of Liquid Crystalline Siloxane Polymer

Liquid crystalline siloxane polymer (1) was synthesized according to the following reaction scheme.

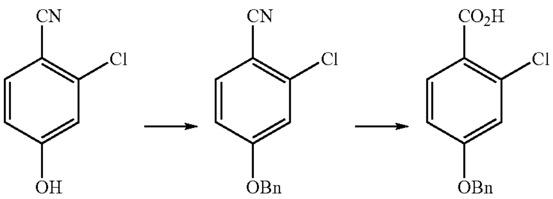
Manufactured by ALDRICH
1a
1b
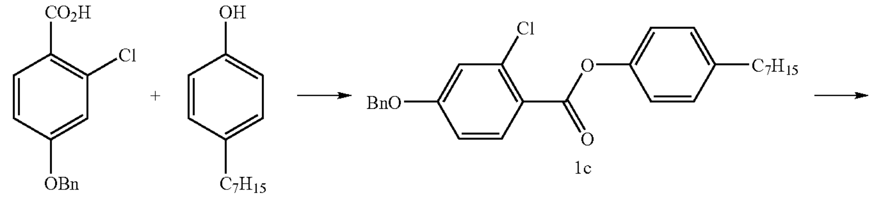
Manufactured by Wako Pure Chemical
1c
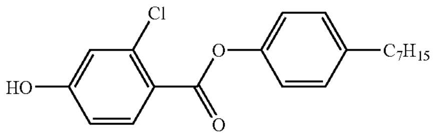
1d
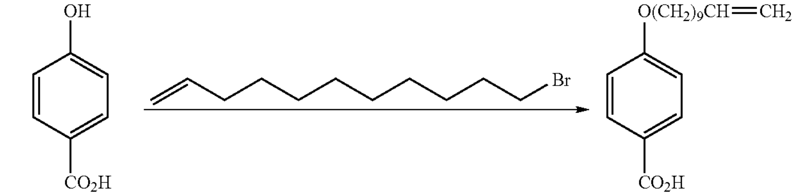
Manufactured by Tokyou Kasei
1e
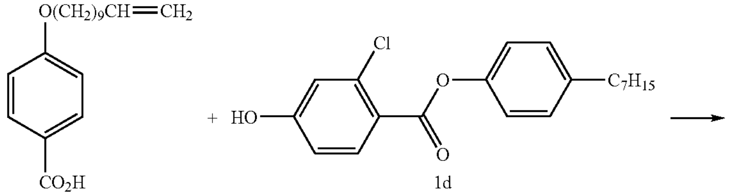
1e
1d
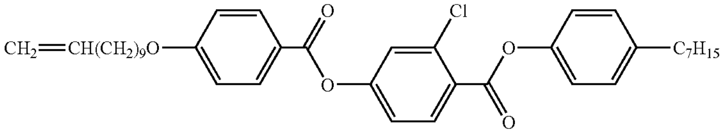
1f
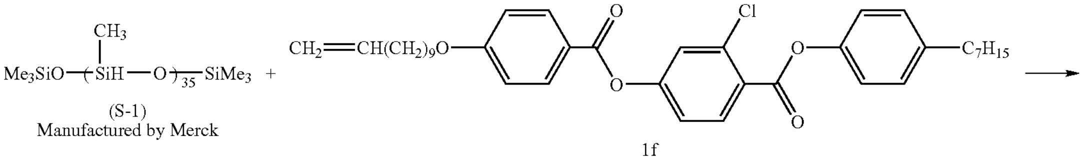
(S-1)
Manufactured by Merck
1f -continued

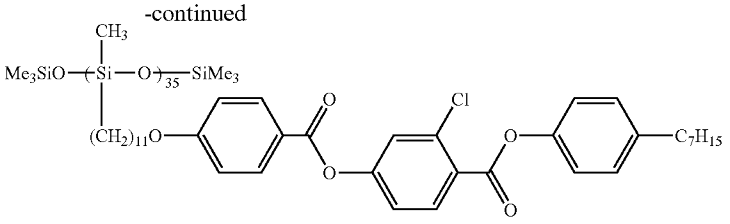

(1)

(Synthesis of Compound 1a)

DMAc solution (100 ml) of 2-chloro-4-hydroxy benzonitrile (10.4 g) (manufactured by Aldrich), benzyl bromide (8.4 ml) and potassium carbonate (12.1 g) was stirred at 90° C. for 3 hours. The reaction solution was added to ethyl acetate/1N hydrochloric acid water, and an organic layer was washed with 1N hydrochloric acid water, and dried with magnesium sulfate, and concentrated in vacuo. The residue after concentration was recrystallized in methanol, and Compound 1a (13.4 g) was obtained.

(Synthesis of Compound 1b)

Compound 1a (13.1 g) and an isopropyl alcohol solution (200 ml) of potassium hydroxide (30.2 g) were heated and refluxed with stirring for 8 hours. The reaction solution was added to ethyl acetate/1N hydrochloric acid water, and an organic layer was washed with 1N hydrochloric acid water, and dried with magnesium sulfate, and condensed in vacuo. The residue after concentration was recrystallized from ethyl acetate/hexane, and compound 1b (13.5 g) was obtained.

(Synthesis of Compound 1c)

Methylene chloride solution (20 ml) of dicyclohexyl carbodiimide (5.1 g) was added dropwisely into methylene chloride solution (50 ml) of Compound 1b (5 g), 4-heptyl phenol (3.7 g) (Wako Pharmaceutical Co., Ltd.), and dimethyl amino pyridine (0.5 g), and the mixture was heated and refluxed with stirring for 1 hour. The reaction solution was added to ethyl acetate/1N hydrochloric acid water, and an organic layer was washed with 1N hydrochloric acid water, and dried with magnesium sulfate, and concentrated under reduced pressure. The residue after concentration was purified in a silica gel chromatograph (developing solvent: ethyl acetate/hexane=1/5), and Compound 1c (7.3 g) was obtained.

(Synthesis of Compound 1d)

10% by mass of Pd/C (0.5 g) was added to a mixed solution of isopropyl alcohol (70 ml)/THF (25 ml) of compound 1c (7.1 g), and stirred under hydrogenation condition and atmospheric pressure for 4 hours. Reaction solution was filtered with selite, and concentrated under reduced pressure. The residue after concentration was purified in a silica gel chromatograph (developing solvent: ethyl acetate/hexane=1/2), and Compound 1d (5.4 g) was obtained.

(Synthesis of Compound 1e)

Potassium iodide (0.22 g) was added to a mixed solution of water (40 ml) of 4-hydroxy benzoate solution (29.3 g), 11-bromo-1-undecene (50 g) and potassium hydroxide (32 g)/ethanol (160 ml), and stirred at 80° C. for 20 hours. Concentrated hydrochloric acid was added to the reaction solution to make the solution acidic, and rough crystals were filtered. Obtained crude crystals were dissolved in an aqueous potassium hydroxide solution, and concentrated hydrochloric acid was added to make the solution acidic, and filtered again, and Compound 1e (51.8 g) was obtained.

(Synthesis of Compound 1f)

Methylene chloride solution (10 ml) of dicyclohexyl carbodiimide (1.4 g) was added dropwise to methylene chloride solution (20 ml) of Compound 1e (1.7 g), Compound 1d (2 g), and dimethyl amino pyridine (0.14 g), and the mixture was heated and refluxed with stirring for 1 hour. The reaction solution was added to ethyl acetate/1N hydrochloric acid water, and organic layer was washed with 1N hydrochloric acid water and dried with magnesium sulfate, and concentrated under reduce pressure. The residue after concentration was purified in silica gel chromatograph (developing solvent: ethyl acetate/hexane=1/5), and Compound 1f (3.3 g) was obtained.

(Synthesis of Siloxane Polymer (1))

A small amount of hexachlorodihydro platinum was added to toluene solution (30 ml) of Compound 1f (3 g) and siloxane polymer (S-1) (0.29 g) (manufactured by Merck & Co., Inc.), and stirred for 6 hours at 80° C. under nitrogen atmosphere. The reaction solution was cooled, and purified in a silica gel chromatograph, and liquid crystalline siloxane polymer (1) (2.4 g) was obtained (the compound was identified by element analysis, NMR and MASS spectrum). The appearance was white solid. The transition temperature of the obtained liquid crystalline siloxane polymer was measured, and the transition temperature from the glass state to the smectic phase A was 56° C., and the transition temperature from the smectic phase A to the isotropic phase was 99° C.

$^1$H-NMR ($CDCl_3$)

δ: −0.12-0.24 (3H, b), 0.36-0.61 (2H, b), 0.78-0.93 (3H), 1.04-1.50 (24H, b), 1.50-1.66 (2H, b), 1.66-1.86 (2H, b), 2.51-2.64 (2H, b), 3.88-4.08' (2H, b), 6.86-7.00 (2H, b), 7.04-7.16 (2H, b), 7.16-7.28 (3H, b), 7.33-7.44 (1H, b), 7.98-8.16 (3H, b)

The number of protons in $^1$H-NMR peak refers to the repeating units in the polymer.

(Synthesis of Dichroic Dye)

Dichroic dye (1-8) was synthesized according to the method disclosed in JP-A No. 2003-192664. Dichroic dye (1-14) was synthesized according to the method disclosed in Japanese Patent Application No. 2004-50265.

Example 3

Preparation of Liquid Crystal Composition 1

A mixture of 5 mg of dichroic dye (1-8), 56.6 mg of siloxane polymer (1; having two-frequency driving characteristic), and 43.5 mg of two-frequency driving liquid crystal (H-1) in accordance with the descriptions in Applied Physics Letters, Vol. 25, 186-188 (1974) was heated on a hot plate at 150° C. for 1 hour, and cooled to room temperature, allowed to stand overnight, and liquid crystal composition 1 was obtained.

(H-1)

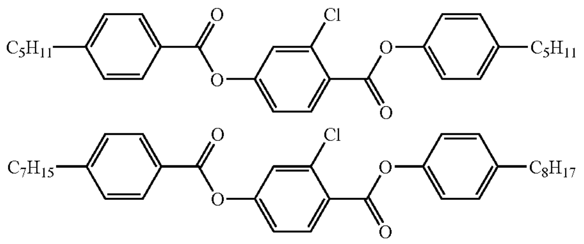

(1:1 mixture)

(Preparation of Liquid Crystal Composition 2)

Liquid crystal composition 2 was prepared in the same procedure except that 1 mg of dichroic dye (1-14) was used instead of 5 mg of dichroic dye (1-8).

(Preparation of Liquid Crystal Composition 3)

Liquid crystalline siloxane polymer (11) was synthesized according to the synthesizing method of the liquid crystalline siloxane polymer (1). Liquid crystal composition 3 was prepared in the same manner as in the preparation of liquid crystal composition 1 except that the siloxane polymer (11) was used instead of the siloxane polymer (1).

(Preparation of Liquid Crystal Composition 4)

Liquid crystal composition 4 was prepared in the same manner as in the preparation of the liquid crystal composition 3 except that 1 mg of dichroic dye (1-14) was used instead of 5 mg of the dichroic dye (1-8).

(Preparation of Comparative Liquid Crystal Compositions 1 and 2)

As a comparative example, comparative liquid crystal composition 1 was prepared in the same manner as in preparation of the liquid crystal composition 1 except that siloxane polymer (S-2) disclosed in JP-A Laid-Open No. 9-40955 was used instead of the siloxane polymer (1).

Comparative liquid crystal composition 2 was prepared in the same manner as in preparation of the comparative liquid crystal composition 1 except that 1 mg of dichroic dye (1-14) was used instead of 5 mg of the dichroic dye (1-8);

(S-2)

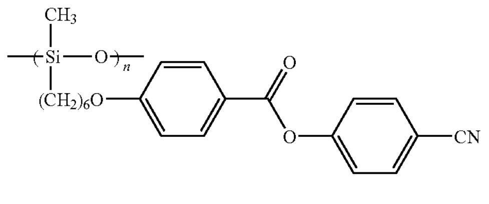

Example 4

Preparation of Liquid Crystal Element

Each of the liquid crystal compositions obtained above was disposed in a commercially available liquid crystal cell (with an ITO transparent electrode, a glass plate having 0.7 mm in thickness, cell gap of 8 μm, with epoxy resin seal, manufactured by E.H.C. Co., Ltd.) at 150° C., and a liquid crystal element was manufactured. Orientation film is not provided on the ITO transparent electrode.

<Evaluation of Two-Frequency Driving Performance>

Rectangular alternating-current voltage of a low frequency (35 V, 100 Hz) was applied to the prepared liquid crystal elements, and the transmittances were measured by using a spectrophotometer (trade name: UV-2400PC, manufactured by Shimadzu Corporation). Next, rectangular alternating-current voltage of a high frequency (35 V, 10 kHz) was applied thereto, and the transmittances thereof were similarly measured. Results are shown in Table 2.

TABLE 2

| Liquid crystal element | Siloxane polymer | Dichroic dye | Abs (100 Hz) | Abs (10 kHz) | Remarks |
|---|---|---|---|---|---|
| A | 1 | 1-8 | 0.15 | 1.38 | Invention |
| B | 1 | 1-14 | 0.14 | 1.51 | Invention |
| C | 11 | 1-8 | 0.15 | 1.35 | Invention |
| D | 11 | 1-14 | 0.13 | 1.27 | Invention |
| E | S-2 | 1-8 | 0.15 | 0.17 | Comparison |
| F | S-2 | 1-14 | 0.13 | 0.15 | Comparison |

As is apparent from the results shown in Table 2, while the comparative liquid crystal elements remain in the vertical orientation at the both low frequency and high frequency, the liquid crystal elements of the present invention are oriented in the vertical direction by applying voltage of a low frequency, and oriented in the horizontal direction by applying voltage of a high frequency. It has been proved that the liquid crystal elements of the present invention have two-frequency driving characteristics.

Further, the responsive speed was measured by using the liquid crystal elements, and it has been found that the liquid crystal elements of the present invention have a high speed responsiveness as compared with the comparative liquid crystal elements which do not exhibit a two-frequency driving characteristic. It is hence confirmed that the responsive speed is faster in the liquid crystal elements of the present invention because they can be switched off actively by two-frequency driving.

INDUSTRIAL APPLICABILITY

As described herein, the present invention provides a liquid crystal composition having a high display responsive speed and high display performance, and a liquid crystal element containing the liquid crystal composition, in the polymer dispersion type guest-host system. The present invention also provide a liquid crystal composition having a high display contrast and a high responsive speed, a liquid crystal element containing the liquid crystal composition, and a siloxane polymer preferably used in the liquid crystal composition and liquid crystal element.

The invention claimed is:

1. A liquid crystal composition comprising a siloxane polymer, a nematic liquid crystal compound substituted with at least one fluorine atom, and at least one dichroic dye, wherein the siloxane polymer contains a repeating unit selected from the group consisting of a repeating unit represented by formula (1) and a repeating unit represented by formula (11):

Formula (1)

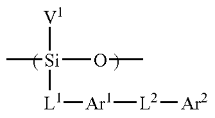

Formula (11)

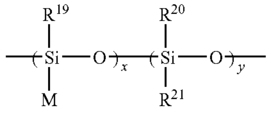

wherein in formula (1), $V^1$ represents an alkyl group, a cycloalkyl group, an aryl group, or a heteroaryl group, $L^1$ and $L^2$ represent divalent linking groups, respectively, and $Ar^1$ and $Ar^2$ each independently represents an aryl group or a heteroaryl group, and in formula (11), $R^{19}$, $R^{20}$, and $R^{21}$ each independently represents an alkyl group or an aryl group, M represents a liquid crystalline group, x represents 3 to 100, y represents 0 or more, and when y is 0, the polymer represented by formula (11) is a homopolymer, and when y is not 0, the polymer represented by formula (11) is a copolymer.

2. The liquid crystal composition of claim 1, wherein $V^1$ in Formula (1) represents an alkyl group.

3. The liquid crystal composition of claim 1, wherein $L^2$ in Formula (1) represents an ester group.

4. The liquid crystal composition of claim 1, wherein the dichroic dye is at least one of anthraquinone compounds and phenoxazone compounds.

5. The liquid crystal composition of claim 1, wherein the dichroic dye has a substituent represented by Formula (2);

$$-(Het)_j-\{(B^1)_p-(Q^1)_q-(B^2)_r\}_n-C^1 \quad \text{Formula (2)}$$

wherein Het is an oxygen atom or a sulfur atom, $B^1$ and $B^2$ each independently are an arylene group, a heteroarylene group, or a divalent aliphatic hydrocarbon group, $Q^1$ is a divalent linking group, $C^1$ is an alkyl group, a cycloalkyl group, an alkoxy group, an alkoxy carbonyl group, an acyl group or an acyl oxy group, j represents 0 or 1, p, q and r each independently represent an integer of 0 to 5, n is an integer of 1 to 3, the total number of the groups represented by $B^1$ and the groups represented by $B^2$ is an integer of from 3 to 10, when p, q and r each represent 2 or more, two or more of $B^1$, $Q^1$ and $B^2$ may be the same or different from one another, and when n is 2 or more, two or more of $\{(B^1)_p-(Q^1)_q-(B^2)_r\}$ may be the same or different from one another.

6. The liquid crystal composition of claim 5, wherein at least one of the dichroic dyes is a compound represented by Formula (3);

Formula (3)

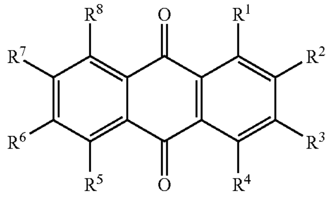

wherein at least one of $R^1$, $R^2$, $R^3$, $R^4$, $R^5$, $R^6$, $R^7$ and $R^8$ represents $-(Het)_j-\{(B^1)_p-(Q^1)_q-(B^2)_r\}_n-C^1$, the others each independently represent a hydrogen atom or substituent Het represents an oxygen atom or a sulfur atom, $B^1$ and $B^2$ each independently represent an arylene group, a heteroarylene group or a divalent cyclic aliphatic hydrocarbon group, $Q^1$ represents a divalent linking group, $C^1$ represents an alkyl group, a cycloalkyl group, an alkoxy group, an alkoxy carbonyl group, an acyl group, or an acyloxy group, j is 0 or 1, p, q and r each independently represents an integer of 0 to 5, n represents an integer of 1 to 3, the sum of the numbers of $B^1$ and $B^2$ is an integer of 3 to 10, when p, q and r each represent 2 or more, two or more of $B^1$, $Q^1$ and $B^2$ may be the same or different from one another, and when n is 2 or more, two or more of $\{(B^1)_p-(Q^1)_q-(B^2)_r\}$ may be the same or different from one another.

7. The liquid crystal composition of claim 5, wherein at least one of the dichroic dyes is a compound represented by Formula (4);

Formula (4)

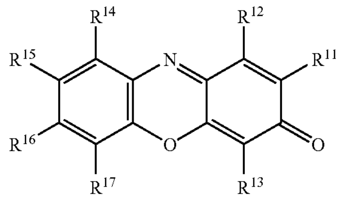

wherein at least one of $R^{11}$, $R^{12}$, $R^{13}$, $R^{14}$, $R^{15}$, $R^{16}$ and $R^{17}$ represents $-(Het)_j-\{(B^1)_p-(Q^1)_q-(B^2)_r\}_n-C^1$, the others each independently represent a hydrogen atom or a substituent; Het represents an oxygen atom or a sulfur atom, $B^1$ and $B^2$ each independently represents an arylene group, a heteroarylene group or a divalent cyclic aliphatic hydrocarbon group, $Q^1$ represents a divalent linking group, $C^1$ represents an alkyl group, a cycloalkyl group, an alkoxy group, an alkoxy carbonyl group, an acyl group, or an acyl oxy group, j is 0 or 1, p, q and r each independently represents an integer of 0 to 5, n is an integer of 1 to 3, the sum of the number of $B^1$ and $B^2$ is an integer of 3 to 10, when p, q and r each represent 2 or more, two or more of $B^1$, $Q^1$ and $B^2$ may be the same or different from one another, and when n is 2 or more, two or more of $\{(B^1)_p-(Q^1)_q-(B^2)_r\}$ may be the same or different from one another.

8. The liquid crystal composition of claim 1, wherein the nematic liquid crystal compound substituted with the fluorine atom is a two-frequency driving liquid crystal compound.

9. A liquid crystal element comprising a pair of electrodes at least one of which is a transparent electrode, and a liquid crystal layer disposed between the pair of electrodes, wherein the liquid crystal layer contains a liquid crystal composition of claim 1.

10. A liquid crystal composition comprising a siloxane polymer having a liquid crystalline group at the side chain of the polymer, a low molecular-weight liquid crystal compound, and a dichroic dye, wherein the siloxane polymer contains a repeating unit selected from the group consisting of a repeating unit represented by formula (1) and a repeating unit represented by formula (11):

Formula (1)

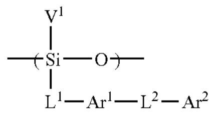

Formula (11)

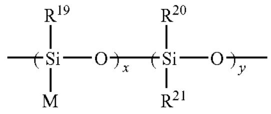

wherein in formula (1), $V^1$ represents an alkyl group, a cycloalkyl group, an aryl group, or a heteroaryl group, $L^1$ and $L^2$ represent divalent linking groups, respectively, and $Ar^1$ and $Ar^2$ each independently represents an aryl group or a heteroaryl group, and in formula (11), $R^{19}$, $R^{20}$, and $R^{21}$ each independently represents an alkyl group or an aryl group, M represents a liquid crystalline group, x represents 3 to 100, y represents 0 or more, and when y is 0, the polymer represented by formula (11) is a homopolymer, and when y is not 0, the polymer represented by formula (11) is a copolymer, and wherein the dielectric constant anisotropy of the liquid crystal composition is changed from being positive to being negative when the frequency of a voltage to be applied is increased.

11. A liquid crystal composition comprising a siloxane polymer having a liquid crystalline group at the side chain of the polymer, a low molecular-weight liquid crystal compound, and a dichroic dye, wherein the siloxane polymer contains a repeating unit selected from the group consisting of a repeating unit represented by formula (1) and a repeating unit represented by formula (11):

Formula (1)

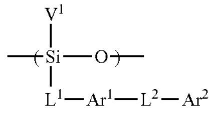

Formula (11)

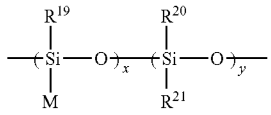

wherein in formula (1), $V^1$ represents an alkyl group, a cycloalkyl group, an aryl group, or a heteroaryl group, $L^1$ and $L^2$ represent divalent linking groups, respectively, and $Ar^1$ and $Ar^2$ each independently represents an aryl group or a heteroaryl group, and in formula (11), $R^{19}$, $R^{20}$ and $R^{21}$ each independently represents an alkyl group or an aryl group, M represents a liquid crystalline group, x represents 3 to 100, y represents 0 or more, and when y is 0, the polymer represented by formula (11) is a homopolymer, and when y is not 0, the polymer represented by formula (11) is a copolymer, and wherein the dielectric constant anisotropy of the liquid crystalline group coupled to the siloxane polymer is changed from being positive to being negative when the frequency of a voltage to be applied is increased.

12. A liquid crystal composition comprising a siloxane polymer having a liquid crystalline group at the side chain of the polymer, a low molecular-weight liquid crystal compound, and a dichroic dye, wherein the siloxane polymer contains a repeating unit selected from the group consisting of a repeating unit represented by formula (1) and a repeating unit represented by formula (11):

Formula (1)

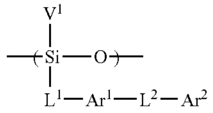

Formula (11)

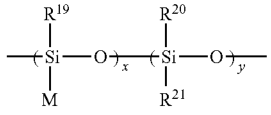

wherein in formula (1), $V^1$ represents an alkyl group, a cycloalkyl group, an aryl group, or a heteroaryl group, $L^1$ and $L^2$ represent divalent linking groups, respectively, and $Ar^1$ and $Ar^2$ each independently represents an aryl group or a heteroaryl group, and in formula (11), $R^{19}$, $R^{20}$, and $R^{21}$ each independently represents an alkyl group or an aryl group, M represents a liquid crystalline group, x represents 3 to 100, y represents 0 or more, and when y is 0, the polymer represented by formula (11) is a homopolymer, and when y is not 0, the polymer represented by formula (11) is a copolymer, and wherein the dielectric constant anisotropy of the low molecular-weight liquid crystal is changed from being positive to being negative when the frequency of a voltage to be applied is increased.

13. A liquid crystal composition comprising a siloxane polymer having a liquid crystalline group at the side chain of the polymer, a low molecular-weight liquid crystal compound, and a dichroic dye, wherein the siloxane polymer contains a repeating unit selected from the group consisting of a repeating unit represented by formula (1) and a repeating unit represented by formula (11):

Formula (1)

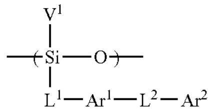

Formula (11)

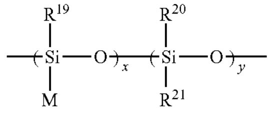

wherein in formula (1), $V^1$ represents an alkyl group, a cycloalkyl group, an aryl group, or a heteroaryl group, $L^1$ and $L^2$ represent divalent linking groups, respectively, and $Ar^1$ and $Ar^2$ each independently represents an aryl group or a heteroaryl group, and in formula (11), $R^{19}$, $R^{20}$, and $R^{21}$ each independently represents an alkyl group or an aryl group, M represents a liquid crystalline group, x represents 3 to 100, y represents 0 or more, and when y is 0, the polymer represented by formula (11) is a homopolymer, and when y is not 0, the polymer represented by formula (11) is a copolymer, and wherein the dielectric constant anisotropy of the liquid crystalline group coupled to the siloxane polymer and the dielectric constant anisotropy of the low molecular-weight liquid crystal are changed from being positive to being negative when the frequency of a voltage to be applied is increased.

14. The liquid crystal display composition of claim 1, wherein the siloxane polymer contains a repeating unit represented by Formula (12);

Formula (12)

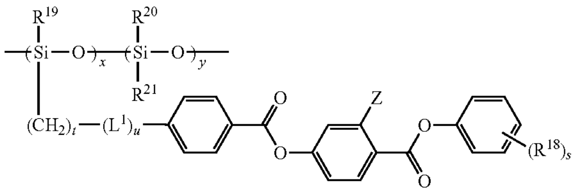

wherein $R^{19}$, $R^{20}$ and $R^{21}$ each independently represents an alkyl group or an aryl group, Z represents a fluorine atom or a chlorine atom, $R^{18}$ represents a hydrogen atom or a substituent, s represents a numeral of 1 to 4, t represents a numeral of 2 to 20, u represents 0 or 1, $L^1$ is a divalent linking group, x represents a numeral of 3 to 100, y represents a numeral of 0 or more, and when y is 0, the polymer represented by the Formula (12) is a homopolymer, and y is not 0, the polymer represented by the Formula (12) is a copolymer.

15. The liquid crystal composition of claim 14, wherein $R^{18}$ in Formula (12) is an alkyl group, an alkoxy group, a cyano group, or a halogen atom, and $L^1$ is a sulfur atom or an oxygen atom.

16. The liquid crystal composition of claim 10, wherein the dichroic dye has a substituent represented by Formula (13);

$$-(Het)_j-\{(B^1)_p-(Q^1)_q-(B^2)_r\}_n-C^1$$ Formula (13)

wherein Het is an oxygen atom or a sulfur atom, $B^1$ and $B^2$ each independently represent an arylene group, a heteroarylene group, or a divalent aliphatic hydrocarbon group, $Q^1$ represents divalent linking group, $C^1$ represents an alkyl group, a cycloalkyl group, an alkoxy group, an alkoxy carbonyl group, an acyl group or an acyl oxy group, j is 0 or 1, p, q and r each independently represent an integer of 0 to 5, n represents an integer of 1 to 3, the total number of the groups represented by $B^1$ and $B^2$ is an integer of 3 to 10, when p, q and r each represent 2 or more, two or more of $B^1$, $Q^1$ and $B^2$ may be the same or different from one another, and when n is 2 or more, two or more of $\{(B^1)_p-(Q^1)_q-(B^2)_r\}$ may be the same or different from one another.

17. The liquid crystal composition claim 10, wherein the dichroic dye is a compound represented by Formula (14);

Formula (14)

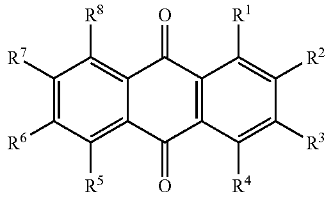

wherein at least one of $R^1$, $R^2$, $R^3$, $R^4$, $R^5$, $R^6$, $R^7$ and $R^8$ is $-(Het)_j-\{(B^1)_p-(Q^1)_q-(B^2)_r\}_n-C^1$, the others each independently represent a hydrogen atom or substituent, Het is an oxygen atom or a sulfur atom, $B^1$ and $B^2$ each independently represent an arylene group, a heteroarylene group or a divalent cyclic aliphatic hydrocarbon group, $Q^1$ is a divalent linking group, $C^1$ is an alkyl group, a cycloalkyl group, an alkoxy group, an alkoxy carbonyl group, an acyl group, or an acyl oxy group, j is 0 or 1, p, q and r each independently represent an integer of 0 to 5, n is an integer of 1 to 3, the sum of the numbers of $B^1$ and $B^2$ is an integer of 3 to 10, when p, q and r each independently represent 2 or more, two or more of $B^1$, $Q^1$ and $B^2$ may be the same or different from one another, and when n represents 2 or more, two or more of $\{(B^1)_p-(Q^1)_q-(B^2)_r\}$ may be the same or different from one another.

18. The liquid crystal composition of claim 10, wherein at least one of the dichroic dyes is a compound represented by Formula (15);

Formula (15)

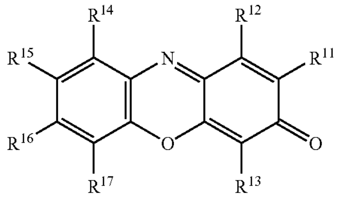

wherein at least one of $R^{11}$, $R^{12}$, $R^{13}$, $R^{14}$, $R^{15}$, $R^{16}$ and $R^{17}$ is $-(Het)_j-\{(B^1)_p-(Q^1)_q-(B^2)_r\}_n-C^1$, the others each independently represent a hydrogen atom or a substituent, Het is an oxygen atom or a sulfur atom, $B^1$ and $B^2$ each independently represent an arylene group, a heteroarylene group or a divalent cyclic aliphatic hydrocarbon group, $Q^1$ is a divalent linking group, $C^1$ is an alkyl group, a cycloalkyl group, an alkoxy group, an alkoxy carbonyl group, an acyl group, or an acyl oxy group, j is 0 or 1, p, q and r each independently represent an integer of 0 to 5, n is an integer of 1 to 3, the sum of the numbers of $B^1$ and $B^2$ is an integer of 3 to 10, when p, q and r each represent 2 or more, two or more of $B^1$, $Q^1$ and $B^2$ may be the same or different from one another, and when n is 2 or more, two or more of $\{(B^1)_p-(Q^1)_q-(B^2)_r\}$ may be the same or different from one another.

19. A liquid crystal element comprising a pair of electrodes, at least one of which is a transparent electrode, and a liquid crystal layer disposed between the pair of electrodes, in which the liquid crystal layer contains a liquid crystal composition of claim 10.

20. A polymer composed of a repeating unit represented by Formula (12);

Formula (12)

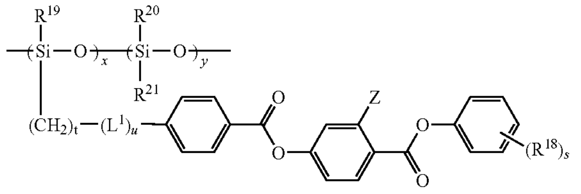

wherein $R^{19}$, $R^{20}$ and $R^{21}$ each independently represent an alkyl group or an aryl group, Z is a fluorine atom or a chlorine atom, $R^{18}$ is a hydrogen atom or a substituent, s is a numeral of 1 to 4, t is a numeral of 2 to 20, u is 0 or 1, $L^1$ is a divalent linking group, x is a numeral of 3 to 100, y is a numeral of 0 or more.

21. The polymer of claim 20, wherein $R^{18}$ in Formula (12) is an alkyl group having 1 to 30 carbon atoms, an alkoxy group having 1 to 30 carbon atoms, a cyano group, or a halogen atom, and $L^1$ is a sulfur atom or an oxygen atom.

* * * * *